(12) United States Patent
Chung et al.

(10) Patent No.: US 6,694,045 B2
(45) Date of Patent: Feb. 17, 2004

(54) GENERATION AND VERIFICATION OF A DIGITIZED SIGNATURE

(75) Inventors: Kevin Kwong-Tai Chung, Princeton, NJ (US); Xiaoming Shi, Highland Park, NJ (US)

(73) Assignee: Amerasia International Technology, Inc., Princeton Junction, NJ (US)

( * ) Notice: Subject to any disclaimer, the term of this patent is extended or adjusted under 35 U.S.C. 154(b) by 60 days.

(21) Appl. No.: 10/127,793

(22) Filed: Apr. 22, 2002

(65) Prior Publication Data

US 2003/0138135 A1 Jul. 24, 2003

Related U.S. Application Data

(60) Provisional application No. 60/351,266, filed on Jan. 23, 2002, provisional application No. 60/352,901, filed on Jan. 30, 2002, provisional application No. 60/359,558, filed on Feb. 22, 2002, and provisional application No. 60/366,061, filed on Mar. 19, 2002.

(51) Int. Cl.$^7$ ................................................ G06K 9/00
(52) U.S. Cl. ........................ 382/119; 345/179; 382/187; 348/161
(58) Field of Search ...................... 382/115–123, 187, 382/188, 189, 218; 235/380; 345/156, 179; 348/161

(56) References Cited

U.S. PATENT DOCUMENTS

| | | | |
|---|---|---|---|
| 3,983,535 A | | 9/1976 | Herbst et al. |
| 4,128,829 A | | 12/1978 | Herbst et al. |
| 4,553,258 A | | 11/1985 | Chainer et al. |
| 4,701,960 A | | 10/1987 | Scott |
| 4,736,445 A | | 4/1988 | Gundersen |
| 5,101,437 A | * | 3/1992 | Plamondon ................. 382/122 |
| 5,111,512 A | | 5/1992 | Fan et al. |
| 5,195,133 A | | 3/1993 | Kapp et al. |
| 5,357,563 A | * | 10/1994 | Hamilton et al. ........ 379/91.01 |
| 5,432,326 A | | 7/1995 | Noblett, Jr. et al. |
| 5,818,955 A | | 10/1998 | Smithies et al. |
| 5,930,380 A | | 7/1999 | Kashi et al. |
| 6,064,751 A | | 5/2000 | Smithies et al. |
| 6,236,740 B1 | | 5/2001 | Lee |

OTHER PUBLICATIONS

John E. Verity, "A Handwriting Expert to Foil Virtual Forgers", http://www.businessweek.com/1996/15/b3470129.htm, 1 Page.
Cyber–Sign, "Biometrics", http://www.cybersign.com/techoverview_what.htm, San Francisco, CA, Printed Feb. 15, 2002, 6 Pages.
Cyber–Sign, "Superb Client/Server Architecture And Easy Integration", http://www.cybersign.com/techoverview_tech.htm, Printed Feb. 15, 2002, 3 Pages.
Sally Wiener Grotta, Cyber–Sign, PC Magazine, http://www.cybersign.com, Jan. 17, 2001, 2 Pages.
Cyber–Sign, "Cyber–Sign For Electronic Signatures", Jun. 2000, 2 Pages.
Cyber–Sign, "Biometrics & Handwritten Signature Approved For Legal Use By The U.S. Government", http://www.cybersign.com/news_news.htm, San Francisco, CA, Printed Feb. 15, 2002, 3 Pages.
Patrick Brady, "Biometrics But Will You See Any Profits?", www.securitysales.com, Mar. 2002, pp. 30–39.
International Search Report, Aug. 21, 2003, 3 Pages.

\* cited by examiner

*Primary Examiner*—Jayanti K. Patel
(74) *Attorney, Agent, or Firm*—Dann, Dorfman, Herrell & Skillman, P.C.

(57) ABSTRACT

Digitized signatures are recorded in respective digitized signature records. Each digitized signature record includes at least the position of each point of a signature in coordinates relative to a coordinate of a previous point thereof and time. Digitized signatures are identified, verified or authenticated by comparing characteristics thereof, may be indexed for facilitating comparison, may be utilized for network and Internet transactions, and may be converted to image format.

86 Claims, 11 Drawing Sheets

GENERATION AND VERIFICATION OF A DIGITIZED SIGNATURE

This Application claims the benefit of the priority:

of U.S. Provisional Application Ser. No. 60/351,266 filed Jan. 23, 2002,
of U.S. Provisional Application Ser. No. 60/352,901 filed Jan. 30, 2002,
of U.S. Provisional Application Ser. No. 60/359,558 filed Feb. 22, 2002, and
of U.S. Provisional Application Ser. No. 60/366,061 filed Mar. 19, 2002.

The present invention relates to a digitized signature and, in particular, to a method and apparatus for the capture, generation and/or verification thereof.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

The world is long past the time where the economy and society were primarily local and everyone personally knew everyone he encountered, such as in business. As commerce expanded geographically, means other than personal knowledge arose to confirm identity and business. In modern times, with worldwide communication and transportation, business and commerce has become global. In addition, with telephone, undersea cables, radio communication, communication satellites, cell phones, facsimile, e-mail, and the Internet, business and commerce has become virtually instantaneous, irrespective of geographical location. Thus, means of confirming identity and business virtually instantaneously and over long distances have been developed.

Among these are various digital signature transmission and verification protocols, such as public key infrastructure (PKI) which is a form of electronic signature that utilizes encryption codes linked to specific computers and other hardware for providing confirmation and/or verification of users over the Internet. Commercial PKI includes, e.g., those available from VeriSign, Inc. located in Mountain View, Calif. and Digital Signature Trust located in Rockville, Md.

One disadvantage of the available PKI systems is that they lack mobility because the PKI code or key is associated with a particular equipment with which it is registered and must be used. Security and authentication comes in part from the equipment that is registered to the authorized user (person, company or other organization) in conjunction with a public key. Because PKI does not utilize biometric data as verification, anyone gaining access to the registered equipment could engage in a public key transaction and appear authentic.

Certain retail transactions such as credit card purchases now utilize an electronic pad and pen to capture an image or graphic of the signature of the person engaging in a transaction, but the signature image is for credit authorization and is not biometrically verified as belonging to the authorized cardholder. Such digital signature images are typically in an image format such as the JPEG, TIFF or the like, and typically require a substantial memory capacity to store, e.g., typically about three kilobytes. With millions of transactions occurring, the amount of memory capacity needed to store such digital signature images quickly becomes quite large, if not prohibitive. Moreover, because such images can be "cut and pasted" electronically, they can easily be falsified by being copied into a different document or file, and so because the copy cannot be distinguished from the original, image signatures cannot offer satisfactory security and authentication.

Other digital signature arrangements also utilize signature pads, e.g., U.S. Pat. Nos. 6,064,751, 5,818,955, and 5,195,133, and characterize certain characteristics of the signature, but all require substantial memory for recording the signature and/or its characteristics, typically, most require 2–4 kilobytes (2000–4000 bytes). Even in a known example of a vector method, the starting point can require as many a 5 bytes or more and each subsequent point can require as many as two additional bytes, so that a complete signature still requires as much as 1–3 kilobytes of memory. Known conventional signature digitizing schemes are based on averages and/or statistical data of various signature characteristics typically derived from a plurality of signings, and so biometric data of any particular signature is lost and is unavailable.

Accordingly, there is a need for a method for digitizing a signature that typically requires less than 1 kilobyte of memory, and preferably less than 500 bytes of memory for a typical signature. Moreover, it would be desirable for such method to be compatible with inexpensive hardware interfaces and for use over the Internet, as well as in other non-Internet utilizations, and to retain certain biometric data of the signature for use in signature authentication.

To this end, the present invention comprises a method for generating a digitized signature record from a signature signed on a signing comprising: recording the starting point of each stroke of the signature and point locations of each stroke of the signature between the starting point and the lift off point, until the signature is completely signed; determining and storing a number of bits for storing the point locations of the strokes of the signature; storing a sampling time or rate at which the recorded points are recorded; storing the locations of the starting points of each stroke of the signature; and coding in the determined number of bits the locations of the points of each stroke of the signature in values relative to a starting point or an immediately previous point thereof, and storing same in the digitized signature record.

According to another aspect of the invention, the method is also for authenticating a digitized signature comprising generating for each signature from the recorded coded point coordinates and times thereof at least two corresponding characteristics of each signature including: a size and shape, a number of strokes, a length of strokes, a number of closed loops, an order or sequence of strokes, a tangent of one or more strokes or segments, a time of the signature or a stroke or segment thereof, a speed of a stroke or of a segment, and/or a derivative of any of the foregoing. Further, comparing the at least two characteristics generated for the signatures and identifying or authenticating the signatures if the comparison correlates to at least a predetermined value.

BRIEF DESCRIPTION OF THE DRAWING

The detailed description of the preferred embodiments of the present invention will be more easily and better understood when read in conjunction with the FIGURES of the Drawing which include.

Figure 1A:
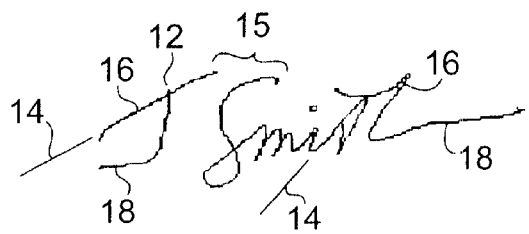
FIGS. 1A, 1B and 1C are examples of signatures that may be captured and digitized and/or reproduced from a digitized signature.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similarly, similar elements or features may be designated by like alphanumeric designations in different figures of the Drawing and with similar nomenclature in the specification, but in the Drawing are preceded by digits unique to the embodiment described. For example, a particular element may be designated as "xx" in one figure, by "1xx" in another figure, by "2xx" in another figure, and so on. It is noted that, according to common practice, the various features of the drawing are not to scale, and the dimensions of the various features are arbitrarily expanded or reduced for clarity.

DESCRIPTION OF THE PREFERRED EMBODIMENT

Figure 1B:
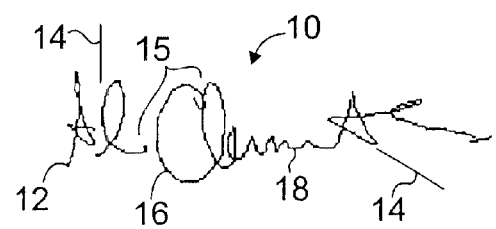
Figure 1C:
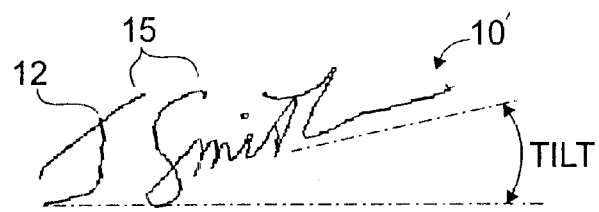

FIGS. 1A, 1B and 1C are examples of signatures that may be captured and digitized and/or reproduced from a digitized signature. Signature 10, illustrated as a signature image reproduced from a digitized signature record, has various unique biometric characteristics that render it a reliable and accurate biometric that is substantially unique to the person who signs it and so is reliable and accurate for comparison to another digitized signature for authentication.

As used herein, capture of a digitized signature generally involves generating or producing a digital or digitized representation of a signature made by a person. Signature capture is typically accomplished by the person signing his signature on a pressure-sensitive or position sensitive surface, such as an electronic pad o device, with a stylus or pen that may be a standard stylus or pen or a stylus or pen specially adapted for use with the electronic pad. Electrical signals produced by such devices are coded to produce the digitized representation of the signature.

Suitable signature sensing devices include, but are not limited to, pressure-based touch screen devices such as computers, e.g., computers utilizing a Windows (Microsoft), a MacIntosh (Apple) or a Unix operating system, as well as "Palmtop" or other personal digital assistant devices, pocket PCs and the like, using the Windows CE or Palm operating system software, as well as pressure and induction-based electronic pads that function like or in place of a conventional computer mouse. Examples include Wizard Brush, WP3325U and WP4030U devices available from UC-Logic Technology Corporation located in Taiwan, Pen Power devices available from Pen Power Technology, Ltd. located in Taiwan, E-Pen devices available from InMotion located at Dallas, Tex., Smart Tablet devices available from Glacier Computer located in New Hampshire, and similar devices available from Fujitsu of Japan, from Hewlett Packard (HP) located at Palo Alto, Calif. and from others.

Authentication or verification generally comprises comparing two digitized signature representations to determine the degree of sameness and/or similarity, e.g., for determining whether the person who signs a signature is the same person or is a different person than the person he claims to be, i.e. the person who signed an original (or reference) signature. The biometric characteristics of a signature, e.g., such as the total number and sequence of strokes, the slopes of various portions of the signature, and/or the speed of pen movement at various parts of the signature, and/or other characteristics, are different for each person. Typically, one digitized signature is referred to or designated as a "standard" or "reference" or "exemplar" signature and the other as a "transaction" or "working" signature. In practice there is no difference between the method by which each is captured and recorded in a signature record and the apparatus employed therefor, other than the designation applied to the resulting digitized signature data record. Typically, a standard or reference digitized signature is captured at a registration, an enrollment, a sign on, an initial or preliminary transaction or other process in advance of a transaction employing a digitized signature and is stored for use in authenticating a future transaction. Verification and authentication are used interchangeably herein.

Identification, on the other hand, generally comprises comparing an unknown (transaction) digitized signature representation to a plurality of known digitized signature representations to determine whether any of the known digitized signature representations matches the unknown digitized signature representation with a sufficient degree of sameness and/or similarity, e.g., for determining the identity of the person who signs the unknown signature from the known identity of the person who signed a matching known (or reference) signature. Typically, the plural known digitized signature representations are stored in a computer database and are related to corresponding records, typically in the same data base, pertaining to the signer thereof.

For a conventional written signature, the difference between the original and a copy is often quite apparent. Such is not necessarily the case for a conventional digitized signature. For a conventional digitized signature which is based upon an image of the signature or averages of various signature parameters, cut and paste copying can result in unauthorized application of the digitized signature. Even an expert forger, while he may be capable of reproducing a facsimile of a written signature that will not easily be detected as a forgery by conventional examination, will not be able to avoid detection where digitized signatures as described herein are compared.

In a typical signature of FIG. 1A, for example, the signature 10 has a starting point 12 and comprises many strokes, each of which has a different slope or tangents 14. In addition, there are breaks 15 where the pen is lifted between strokes. Because signature 10 is a signature reproduced from a digitized signature, the speed of pen movement is evident. Portions of the signature wherein the pen moves slowly 16 are evidenced by a series of very short segments comprising the stroke, whereas portions thereof wherein the pen moves rapidly 18 are indicated by relatively long segments comprising the stroke.

The signature of FIG. 1B is quite different, and yet it is characterized by a start point 12, strokes of various slopes or tangents 14, and portions of slow pen movement 16 and of rapid pen movement 18, all very different and distinctive from the characteristics of the signature 10 of FIG. 1A.

Even the signature 10 made by the authentic person will vary depending upon circumstances: whether the person is sitting or standing or in another position, the relative position and stability of the writing surface upon which the signature is made, the pen used, aging, lighting conditions, the environment and many other factors. Thus, the authentic person's signature may vary significantly in size, in the slope or tilt relative to the start point 12, the actual speed of pen movement, and the like. FIG. 1C illustrates an authentic signature 10' made by the same person who made signature 10, but signature 10' has different size and tilt. Accordingly, it is desirable that the digitized signature be normalized so that such apparent differences between authentic signatures 10, 10' have a less significant effect upon the comparison of those signatures. With normalization, differences of signature size and tilt which tend to more reflect the circumstances, rather than the authenticity of the signature, are removed. Even with normalization, however, it is noted that the number and sequence of strokes, and the slopes of the various portions and the speed of pen movement at which they are made will tend to be consistent.

As described below, digitized signatures according to the method are not images of the signature, but may be converted into an image format for reproducing a representation of the original signature that was digitized. Such image representation may be in any suitable format, such as TIFF, JPEG, BITMAP and the like, however, in such format the image typically requires about 3–10 kilobytes in contrast to the typical 300 bytes required in the present digitized signature format. Because such conversion to an image format usually produces visible segmentation of the strokes, although such is not necessarily present, the reproduced image may be easier to detect if it were to be copied into another document or file.

Figure 2:
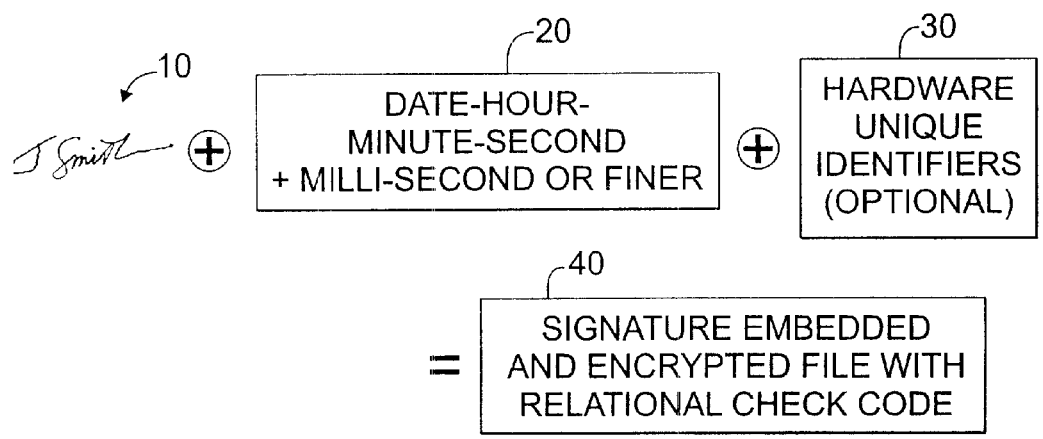
FIG. 2 is a schematic flow diagram representing the generating of a data record including a digitized signature.

FIG. 2 is a schematic flow diagram representing the generating of a data record 40 including a digitized signature 10. A typical application where the generation of a digitized signature and the comparison of digitized signatures for authentication and verification is useful is for transactions conducted over the Internet. Such transaction may include, for example, purchases made by a person at a home or office computer connecting to the via the Internet to the web site of a provider of goods and/or services and then purchasing or contracting for goods and/or services, charging the cost thereof to an account with the provider, or to a credit or debit card, or to another account with a third party. Such transactions could encompass highly sensitive transactions, such as persons making banking, investment and/or other financially significant transactions, and/or business and commercial transactions or contracts involving many thousands or millions of dollars.

In addition to the generation of a digitized signature that responds to the unique biometric characteristics of the person making the signature, it may be desirable to have an additional uniqueness associated with the digitized signature to render it more difficult to copy, or at least to make detection of such copying more easily detected. The method of FIG. 2 generates a digitized signature 10, as is described in detail herein below. A date/time tag 20 is associated with digitized signature 10 wherein the date includes day, month and year, and the time includes the hour, minute, second, and preferably the millisecond or finer time interval. Because it is usually relatively easy for a computer literate person to change the date and time record of a typical computer and so to falsify any desired date and time, the local computer date and time is generally to be avoided. Date/time tag 20 acquires the date and time data from the Internet server through which the person conducting the transaction is connected to the web site of the other party, which date and time (e.g., to the millisecond) cannot be changed even if the person were to have access to the server.

This is thought to make it more difficult to electronically copy or duplicate or forge a digitized signature. For example, if an unauthorized use of the digitized signature is attempted by cutting and pasting an authentic digitized signature record to another document or transaction, then the date/time data associated with the digitized signature from its original and authentic use will differ from the date/time data relating to the second or further use associated when the digitized signature record is transmitted via an Internet server. In addition to a signature being unique to an individual, each signature signed by that individual differs in some respect from other signatures signed by him, and so will not be a perfect match when digitized and compared. A copied digitized signature will be a perfect reproduction of the prior (copied) signature and so will match perfectly, thereby indicating copying. Further indicators of re-use of a digitized signature are discussed below.

Optionally, or alternatively or additionally, one or more hardware identifiers 30, i.e. data representative of the identity of the hardware (e.g., the computer and/or processor and/or hard drive and/or network card serial numbers or other identifier) being utilized, can also be associated with the signature record 40, thereby to provide a greater degree and ease of traceability for a digitized signature utilized in a transaction. Also, signature record 40 including the digitized signature 10, the date/time stamp, and the optional hardware identifier 30, may be encrypted by any suitable means to further secure the embedded digitized signature record against unauthorized extraction of the digitized signature, or other tampering and/or other unauthorized review or use.

Figure 3:
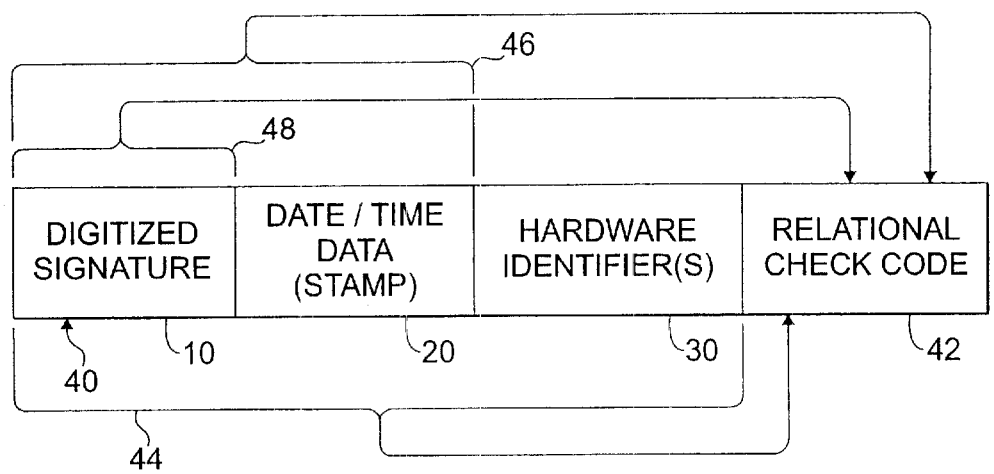
FIG. 3 is a schematic diagram representing an example of a data word representing a digitized signature record.

A digitized signature record 40, such as is illustrated in the schematic diagram of FIG. 3, represents an example of a data word 40 representing a digitized signature record produced according to FIG. 2. Signature record 40 includes at least three parts: digitized signature 10, date/time data 20, and a relational check code 42. Relational check code 42 is generated, for example, from the data values of digitized signature 10 as illustrated by the bracket 48 and arrow therefrom to check code 42, or from the data values of digitized signature 10 and date/time data 20 as illustrated by the bracket 46 and arrow therefrom to check code 42, and so is indicative of those data values.

Relational check code 42 enables a recipient of signature record 40 to authenticate the values of digitized signature and date/time stamp 20 by independently generating a relational check code value therefrom and then comparing the relational check code generated by the recipient with the relational check code included in signature record 40. If none of the data of record 40 has changed, whether by alteration, by actual or attempted forgery, or by transmission error, or otherwise, then the recipient-generated check code will be the same as the check code 42 of data record 40. If the check codes are not the same, then the integrity of data record 40 is suspect. Herein, the relational check code or number is usually referred to simply as the relational check code to include numbers and/or codes.

Where the optional hardware identifier(s) 30 is(are) utilized, relational check code 42 is generated, for example, from the data values of digitized signature 10 and date/time data 20 and hardware identifier(s) 30, as illustrated by the bracket 44 and arrow therefrom to check code 42, and so is indicative of those data values.

The foregoing arrangement permits detection of errors and/or changes to the digitized signature record at any time by reading the digitized signature record and recalculating the relational check code which is then compared to the relational check code read from the digitized signature record. If the read and calculated relational check codes match, then there is a high degree of certainty that the digitized signature record has not been changed and does not include errors.

It is noted that while the relational check code is referred to as a "code" or as a "number," it may include numerical, alphabetic, alpha-numeric and other characters and symbols, conventional or arbitrary, as may be desired. The relational check code is representative of the information stored in the digitized signature record in accordance with a predetermined formula or algorithm or other scheme, either on a character by character basis or on the basis of one or more combinations of the characters or values stored in the digitized signature record. Suitable formula and algorithms include, for example, parity checks or other parity representations, sum checks, field relationship checks or any other predetermined relationship between the digitized signature record data values and the relational check code.

Thus, any change to the digitized signature record information, including a change that changes the value of the relational check code or number, will be detectable and an indication that the digitized signature record contains one or more errors or changes. Typically, the particular formula or algorithm that generates the relational check code is not known to third parties and is not derivable from the data stored in the digitized signature record, and so the relational check code provides a degree of security for the digitized signature, date/time stamp, and/or hardware identifier information stored in the digitized signature record. The relational check code can include many bits and so can be constructed to permit error correction as well as error detection.

The formula or other algorithm or other encoder for generating the relational check code or number may be provided in protected firmware, in software or in a combination of firmware and software, to provide a higher level of security against deciphering or unauthorized coding. For additional security, each encoder may also include a unique hardware identifier that must be paired with coding software having the same unique identifier for enabling proper functioning. The unique encoder identifier may also be included in or as part of the digitized signature record. Further security is provided by encrypting the digitized signature record, e.g., as by the MD5 message encryption protocol or other conventional 128-bit encryption in common use for Internet communication.

Figure 4:
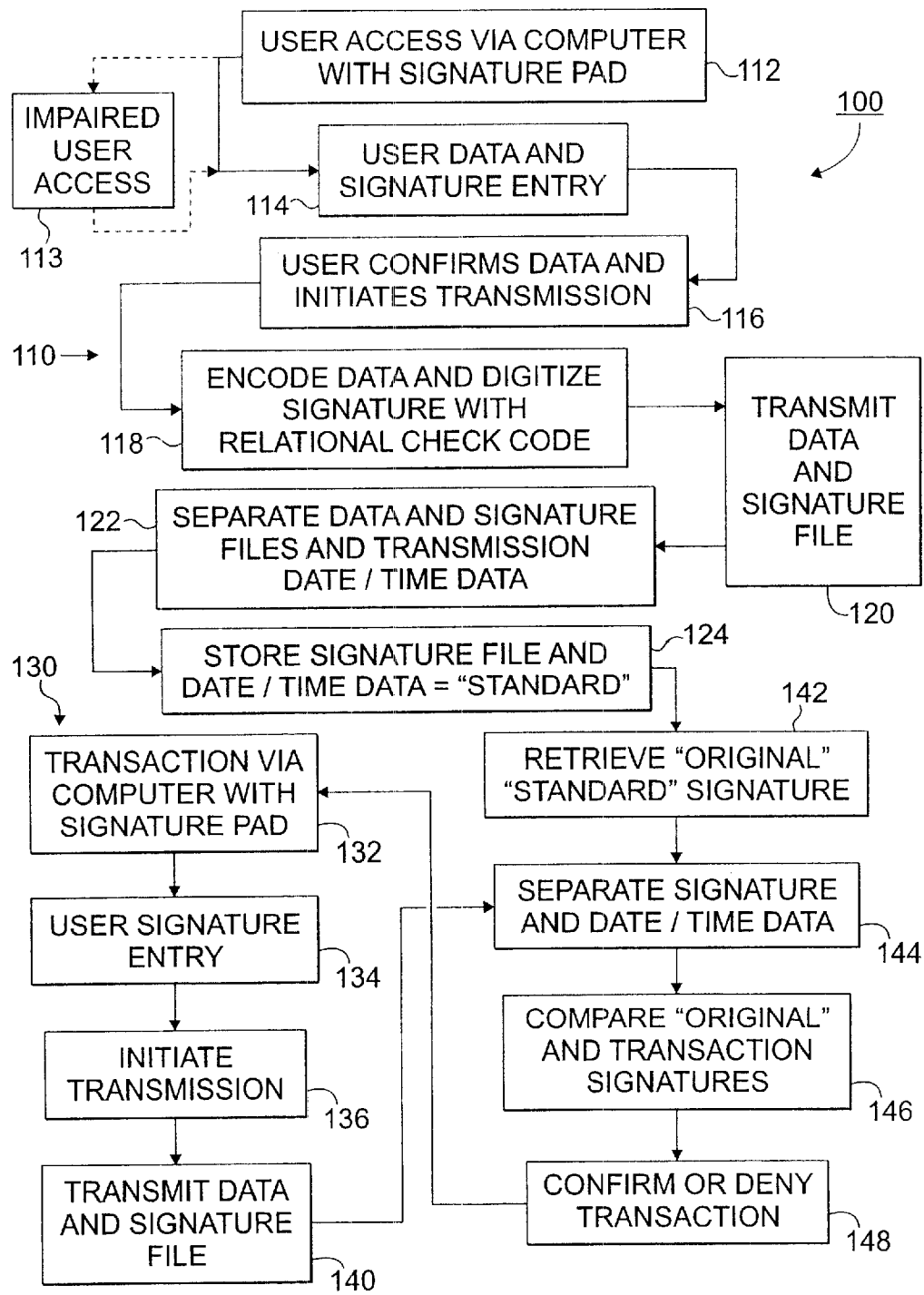
FIGS. 4 and 5 are schematic flow diagrams illustrating a method for generating a digitized signature and for verifying same in relation to a transaction.

FIG. 4 is a schematic flow diagram illustrating a method 100 for generating a digitized signature and for verifying same in relation to a transaction, e.g., an Internet or other e-commerce transaction. In method 100, a digitized signature is generated 110 or "captured" for a particular user, is then transmitted 120 as digitized signature and other data in a digitized signature record or file and stored 124 as a "standard" or "baseline" or "exemplar" signature for that particular user. Thus far, the process could be characterized as a registration or sign-up of a particular user. In practice, typically, many users would be registered over a period of time. Subsequently, the user may engage in a transaction 130 or plural transactions wherein a digitized signature for each present transaction is verified by comparison to the standard digitized signature previously stored.

Registration 110 comprises a user accessing 112 via a computer associated with a device having signature capturing capability the particular web site or Internet application. Various devices, both stationary and mobile, may be employed for capturing a signature, including, but not limited to, touch screen devices, resistive and/or inductive and/or other pressure sensitive pads, pocket PCs, Palmtop and other hand-held devices, personal data assistant (PDA) devices, "Tablet" PCs, and the like. The stylus and/or pen associated with such device may be a common pen (e.g., an ink-based writing device) or may be a specific device intended for use with the particular signature capture device, and may include an ink-based writing capability. In general, many people prefer an electronic signature pad that provides at the tip of the stylus or pen an instantaneous visual representation (visual feedback) of what has been written (as does an ink pen), rather than one where there is no visual feedback and/or the signature appears on a display remote from the pen tip.

In accessing 112 the application, a digitized signature capturing software application may be downloaded to the user's computer from the web site via the Internet or an Intranet, e.g., as a "plug in," if not already present on the user's computer. The user then enters 114 his signature and any other information or data required or desired in relation to registration 110. Upon completion of entering 114 data, the user confirms 116 the data and initiates transmission thereof. In preparing the data and signature for transmission, the signature capturing application encodes 118 the signature and any other data to be transmitted and protects it with a relational check code 118 as described. Such information, data and signature may be entered on a "document" presented visually on the display of the user's computer, and the entire document, as well as the signature and data, may be digitized and protected 118 by the relational check code.

Registration 110 may include applying for a credit card or other account, to supplement an existing card or account with digitized signature data, to register to vote, to vote by absentee ballot, to apply for insurance, to submit claims, or any other form of business, commercial or government transaction. Where digitized signature is utilized in conjunction with a credit or debit or other account associated with a smart card, the digitized signature may be stored in the memory of the smart card for comparison/verification at a point of use.

Transmission 120 of the digitized signature and data as a digitized signature record is typically via the Internet or over an Intranet or other communication link and/or network, typically with a suitable level of encryption, such as a conventional 128-bit or greater encryption algorithm. Date/time data (e.g., to millisecond of time) obtained from the Internet or other server is associated with the digitized signature record and may also represented in the relational check code. The digitized signature data is separated 122 from the date/time data and each is stored 124 as a "standard" for the particular registered user. While certain conventional signature verification systems require that plural samples of a person's signature be captured in order to generate sufficient samples to statistically characterize the signature to account for variations present in any single signature, it is not necessary with the present system to capture plural samples although plural digitized signature samples may be used.

In a transaction 130, transaction 130 is initiated 132 using a computer having an associated signature pad, similarly to that for registration 110 above. After entering data 132 to define the desired transaction, the user enters 134 his signature via the signature pad and initiates transmission 136 of the digitized signature and transaction data to the other party, e.g., as described above. The digitized signature and transaction data is generated and transmitted 140 as a data and signature file, similarly to a digitized signature record, with a relational check code. Upon receipt by the other party, the digitized signature and date/time data are separated 144 from the other transaction data. In addition, the "standard" digitized signature for the person identified in the transmitted transaction data is retrieved 142 and the digitized signature data for the particular transaction is compared 146 directly therewith.

If the transaction digitized signature and the standard digitized signature for the person match (to within specified criteria, as described below), then the transaction is confirmed 148 back to the user. If the transaction digitized signature and the standard digitized signature for the person do not match, then the transaction is denied 148 and the user is so advised. If permitted by the transaction protocol established by the party, usually the credit agency, vendor, bank, insurance company, or government agency, the user may be permitted to make more than one attempt at entering a signature for establishing a match or his identity may then be confirmed by other means, e.g., personal appearance, photo identification, and the like.

It is noted that user access in method 100 may include features permitting access 113 by people with certain impairments and/or limitations, such as visual impairment, hearing impairment, and the like. For example, impaired user access 113 may include voice or other audible instructions and/or voice/speech recognition and/or an enlarged visual display, e.g., line by line enlargement, to assist a sighted user or enable a visually impaired user. Physical features such as a distinct area for signing, raised and/or textured keys on a standard or Braille keyboard, Braille instructions, a Braille readout device, and the like, may also be utilized. Another helpful feature is audible confirmation of data entered, e.g., read back thereof, and the method steps, for enabling easier and timely correction of errors. Any special instructions or requirements for sighted users, e.g., that appear on a screen or other display, may also be assigned to particular keys on a keyboard or given voice commands for other users. Commercial devices and/or software for providing certain features for access by the impaired are available from various sources.

Desirable features for conducting registration and/or transactions as described include one or more of the following:

1. The signature data and application program should not accept graphical signature representations or the like that can be copied, e.g., by cut and paste, from another source.
2. Signature data should be captured substantially in "real time" with a reliable date/time stamp made part of the signature record along with the digitized signature.
3. Devices suitable as signature pads for capturing a signature should be able to detect the locus and speed of the signature needed for digitization.
4. The signature digitizing arrangement should be in modular form that can be attached to or associated with web-based and/or web-enabled applications, e.g., as a software program, that can be downloaded seamlessly (e.g., without significant separate action being required on the part of the user) when the user accesses the application, e.g., via the Internet.
5. The digitized signature and other data or document(s) associated with a registration and/or transaction should be protected by a relational check code generated from the data values of such digitized signature, and preferably also the data and/or document(s). Preferably, the relational check code is generated immediately when the user initiates transmission of data, and the digitized signature data record and the data and/or document file may be "wrapped" into a single file.
6. The digitized signature should be encrypted when transmitted over the Internet, e.g., utilizing 128-bit or greater encryption coding. It is noted that any one or more of the foregoing advantages need not be present or produced in an embodiment including and/or utilizing the invention.

Figure 5:
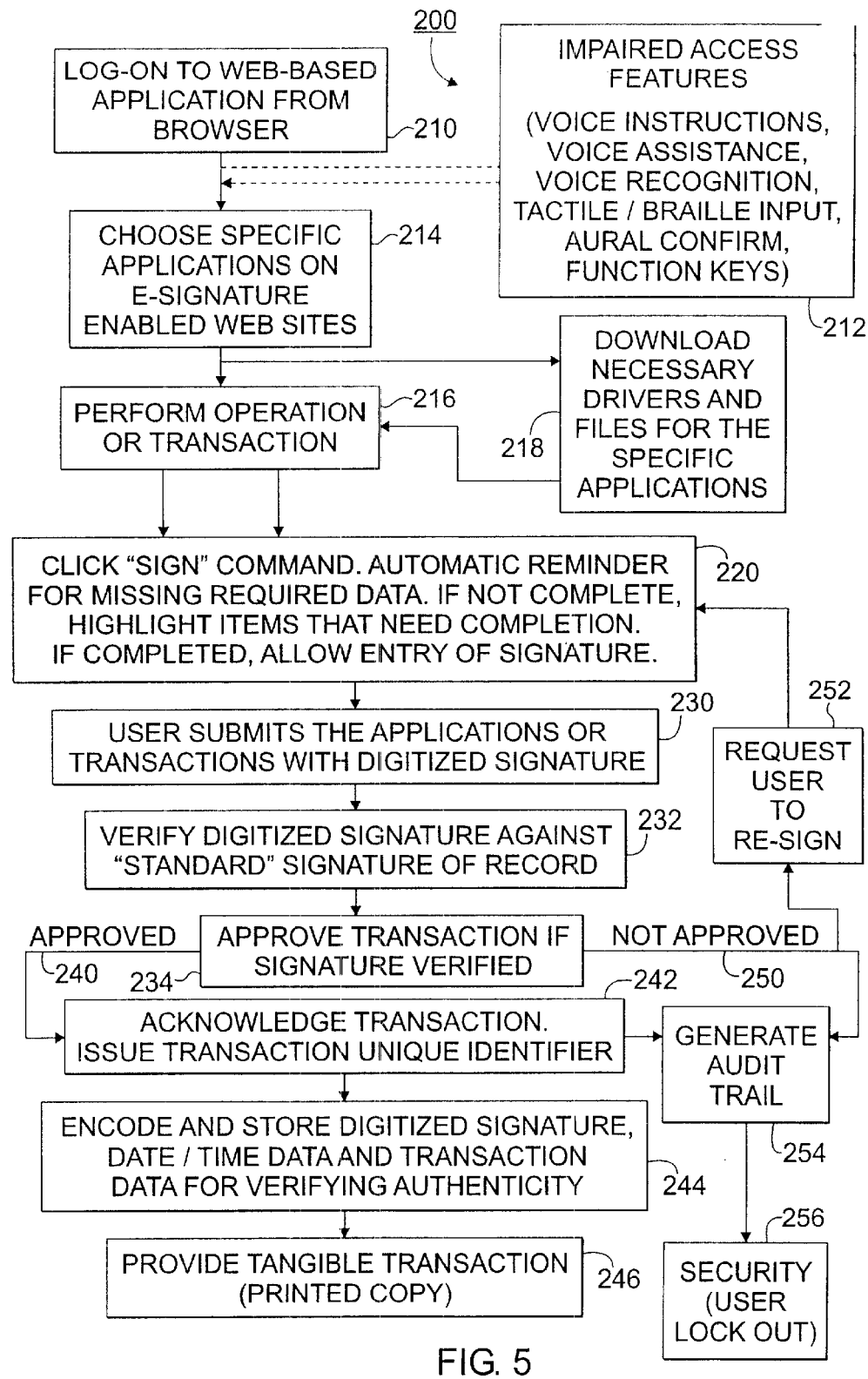

FIG. 5 is a schematic flow diagram illustrating a method 200 for generating a digitized signature and for verifying same in relation to a transaction, i.e. an Internet or other e-commerce transaction. In method 200, a user logs on 210 to a web-based application from his Internet browser and chooses 214 the specific applications of interest on an electronic signature enabled web site, i.e. an application and web site that provide for generation and/or verification of digitized signatures as described herein. It is noted that impaired access features 212 such as sequential display of enlarged instructions, e.g., line by line enlargement, voice instruction, voice assistance, voice recognition, tactile and/or Braille input and outputs, aural confirmation of data and/or transaction, and/or appropriate function keys adapted for access by the impaired, may be provided.

If the necessary drivers, signature digitization and coding, files, and/or other software is not present on the user's computer, such may be downloaded 218 as needed from or with the particular digitized-signature enabled application. Download 218 may be automatic in that it is initiated by the application without user intervention or request, or it may require some user action, e.g., click on a "download" or "accep" button. The user may then perform 216 the operation or transaction as appropriate, e.g., completing forms, making purchases, submitting claims, registering, and so forth.

When the user has completed entering data and otherwise entered what is required for the desired transaction, he clicks 220 on the "sign" button or command to begin generation of the digitized signature. If the user has not completed the prerequisites to signing, he is reminded to provide missing data or perform omitted steps. The reminder typically is automatic in that no user action is necessary, and may take the form of highlighting or otherwise visually distinguishing the data to be provided or the step(s) to be taken. If and when the user completes the necessary data and steps, the signature capture device, e.g., signature pad, is enabled for the user to enter his signature by signing 220 thereon. The user then may submit 230 the application or transaction with the digitized signature embedded in a digitized signature record associated therewith, i.e the user submits a transaction request to the proprietor of the web site subject to verification and acceptance thereof. As above, transmission of data is preferably encrypted with 128-bit or greater encryption.

The web-based application on the server of the web site proprietor (e.g., the server of a bank, insurance company, vendor of goods or service, government or private entity, and the like), verifies 232 the digitized signature, Verifying 232 includes retrieving an original or standard digitized signature associated with the user, i.e. the user as identified in the transaction request, from its database and comparing that standard digitized signature to the digitized signature submitted as part of the proposed transaction request. Approval 234 of the transaction depends upon verification 232 of the digitized signatures.

If the digitized signatures match to the established degree of likeness, the transaction is approved 240 and is acknowledged 242 by transmitting to the user a message so indicating as well as an identifier unique to the transaction, sometimes called a confirmation code or confirmation number or transaction number. The number or code may include a system serial or sequence number, date/time data, and/or other data either related or unrelated to the transaction, as desired.

Closely associated with the approval/acknowledgment steps is the encoding and storing 244 of the digitized signature, date and time data (e.g., to the millisecond) from the Internet server or web site server, and transaction data, for creating a file record that may be used for verifying the authenticity of the transaction. Preferably such file record "binds" the data into a single record that is encrypted and/or protected by a relational check code as described above. At least the digitized signature for the transaction and the Internet transmission date/time data are related and protected by a relational check code to provide a unique signature record (or stamp) for later use for authentication, if needed. Optionally, all or any desired part of the transaction data may be combined and encrypted and/or protected.

For certain applications it may also be desired or necessary to have a written record of the transaction, as is the case where the transaction involves voter registration and the applicable law requires a written (ink) signature. In such instances a tangible transaction record is provided 246, such as by a printer either at the user's computer or at the web site proprietor, for ink signature by the user, and possibly with verification of identity by conventional means such as birth certificate, driver's license, passport, photo identification, and the like.

If the signatures do not match to the established degree of likeness, the transaction is not approved 250 and such result is acknowledged by transmitting to the user a message so indicating. Typically, the user is requested to sign again 252 so that another attempt can be made to complete the proposed transaction (it is usually the desire of both parties that the transaction be completed). After a predetermined number of attempts wherein a matching of digitized signatures is not successful, the user may be "locked out" 256 or otherwise prevented from attempting the proposed and/or other transactions, either for a predetermined period of time or permanently, as determined by the web site proprietor.

Whether the transaction is approved 240 or is not approved 250, an audit trail is generated 254 so that each transaction, proposed or completed can later be investigated, verified or otherwise reviewed. Typically, generating 256 an audit trail keeps track of failed attempts to complete a transaction and locks out 256 the user.

For Internet or web-based applications, it is desirable that the signature pads, PDAs and other devices utilized for capturing a signature be transportable and/or mobile, unlike client-server-based applications where a signature device is associated with each client computer or where the appropriate software drives is installed on each client computer so that a signature device may be utilized therewith. But each computer logging on to a web site cannot be expected to have the necessary software drivers installed. Thus, the signature device should be compatible with the Internet browsers commonly utilized in accessing the Internet, as may be provided by operating systems such as WINDOWS available from Microsoft Corporation of Redmond, Wash., or by an "Active X Control" created in the Visual C++ language for embedding in the web-based application and/or system.

The driver for the applicable signature digitizing device and/or any needed signature digitizing software are made to be downloaded seamlessly (e.g., without requiring the user to initiate an action or to be aware that an action is being taken automatically) to the users computer when the user accesses the web site application utilizing digitized signature generation, capturing, and/or authentication. The driver and/or signature digitizing software preferably does not leave the digitized signature or any signature data on the web browser or hard drive of the user or client computer when a use of the application is finished, so as to improve security and prevent the copying of a digitized signature, although the device driver may remain.

Figure 6:
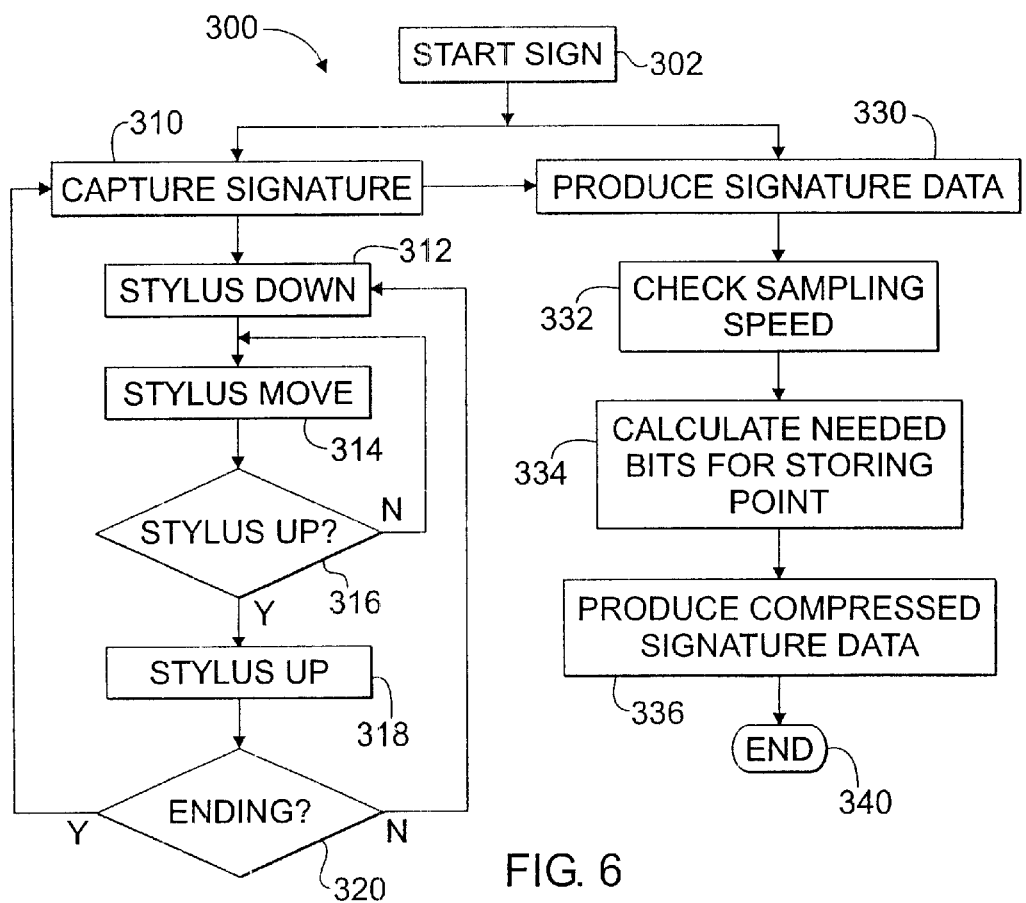
FIG. 6 is a schematic flow diagram illustrating a method for generating a digitized signature.

FIG. 6 is a schematic flow diagram illustrating a method 300 for generating a digitized signature. The method may be referred to as "locus-based signature capture" or a "vector signature" because the method involves characterizing the locus of the pen making the signature from the start of signing to the end of signing. Among the aspects considered are the size and shape of various signature elements, the number of strokes and/or loops comprising the signature, the order and sequence of the strokes, the tangents and/or derivatives of segments and points of the signature, and/or the segmental and overall speed at which the signature is made, and/or derivatives thereof, e.g., instantaneous speed or acceleration. Optionally, the pen/stylus pressure of the signature stokes may be captured if a pressure sensitive or other pressure sensing device is utilized for signing.

In general, a device that has the ability to follow or track the starting point and the strokes/segments of the signature should be suitable for use in practicing the invention. Information representative of the pen/stylus speed at different segments of the strokes, the shapes and sizes of strokes, and the sequence of strokes, may typically be derived from the electronic information provided (captured) by such device. In addition, if the device senses pen/stylus pressure, the pen/stylus pressure for each segment or stroke may also be obtained and included in the digitized signature.

In a preferred embodiment, two bytes are utilized to represent the starting point of each pen stroke and each subsequent point is mapped in relation to the immediately previous point and is coded in a number of bits determined from characteristics of the particular signature. Point location information is acquired and stored essentially in real time, i.e. as the signature is signed, in the x, y or other coordinates of the signing surface of the signature data capturing device. When signing is completed, the point location data is converted from the x, y or other coordinate format to locus signature format as described below, and each point is typically represented in less than one byte, e.g., for signing speeds in the normal range. However, if the speed of signing is higher so that the number of bits required to define each point may exceed one byte, more than one byte may be utilized, so that the length of coding may be self adjusting to signing speed without having many unutilized bits.

In tests involving many different signatures, about 98% of the points required only one byte or less, and none required more than one byte. More than about 90% of the test signatures required about 100–300 bytes for the digitized signature and almost none required more than 400 bytes.

In an alternative embodiment, two bytes are utilized to represent the starting point of each pen stroke and each subsequent point is mapped in relation to the previous point of the stroke and each point is then coded into one byte, a fixed length coding. As above, point location information is acquired and stored essentially in real time, i.e. as the signature is signed, and is converted to locus signature format when signing is completed. Each point is represented in one byte for and signing speed. Because the preferred and alternative embodiments are similar except for the number of bits utilized for defining each point of the signature, the description of the preferred embodiment will be sufficient to describe the alternative to one of ordinary skill.

While the difference between 300 bytes for a digitized signature and 3000 bytes for a conventional digital signature may not seem significant, it becomes so when databases include large numbers of, e.g., 10 million to 100 million, digitized signatures. For example, 300 gigabytes of storage capacity is required to store only one million 3000-byte digitized signatures, which would require hundreds of CD-ROMs just to store the data and would require substantial time to transmit via a typical network. The number of voters in many of the states of the United States far exceed one million, as do the numbers of customers of many credit card companies and banks. Conventional database software, e.g., such as a Microsoft Windows-based SQL server database or an Oracle Unix-based database is suitable therefor.

In terms of FIG. 6, for example, touching a Start Sign 302 button preferably displayed on the signature pad device with the pen/stylus initiates signature capture process 300 with signature capture 310, although the start button and other functional buttons may be provided on another touch-screen device or via a keyboard. Signature capture 310 comprises detecting and recording the coordinates and times at which the stylus is touching the signing surface during the signing of the signature. The coordinates and the times thereof are recorded in the coordinate system and at sampling timing and times of the device having a touch-sensitive signing surface as the signature is signed. Time data may be recorded by actually storing timing data or may be indirectly recorded in that the time data is inherent in the sequence of stylus position coordinate data and the sampling rate of the signing surface device.

Next the captured 310 stored coordinate and time data is transformed or converted into a compact format for a locus-based digitized signature. Each stroke of the signature is separately coded and the digitized representation thereof is stored in a digitized signature data record (also sometimes referred to as digitized signature data and/or as a digitized signature record) in the same order in which it was signed in the complete signature.

For each digitized signature data record, the first four bits of the first byte specify the number of bits that will be utilized to specify each x coordinate of that signature (as the difference in x distance relative to the x coordinate of the previous point) and the second four bits of the first byte specify the number of bits that will be utilized to record each y coordinate of that signature (as the difference in y distance relative to the y coordinate of the previous point). It is noted that the numbers of bits specified for the x coordinate differences and for the y coordinate differences of each stroke of a given signature may be different, however, what ever number of bits is specified for each is maintained for the entire signature record. Preferably, the respective numbers of bits assigned to code the x and y coordinate differences from those of the previous point are determined from the recorded actual x and y coordinates (i.e. calculated therefrom) recorded during signing of the signature, so that efficient utilization of the bits in the digitized signature record may obtain.

Note that the numbers of bits specified for the respective x and y coordinate differences may be different from one signature to another signature. For example, the x difference values may be expressed three bits and the y difference values in two bits, and so five bits are required to specify the location of any given point of a signature in terms of the differences of its x and y coordinates from those of the previous point. When coded in this example, the first five bits of the first byte define x, y coordinates of a first point, the last three bits of the first byte and the first two bits of the second byte define the next point, the third through seventh bits of the second byte define the next point, and so forth. Thus, on average, each byte defines the x and y coordinates of more than one point, thereby reducing the size (number of bytes) needed for a digitized signature record to describe a particular signature in comparison to a coding wherein each point is coded in one byte.

The second byte of the signature record specifies the number of signature points that are sampled and/or recorded per unit of time by the signature capture device, e.g., typically up to 255 different sampling rates can be specified in an 8-bit byte, e.g., in units of samples or points per second, and is useful to define the timing of any point relative to any other point and relative to the signature starting point, and is also useful when the digitized signature record is normalized prior to comparison with another signature record and/or prior to being displayed.

The first stroke of the signature is coded beginning with its starting point x coordinate being specified in the third byte of the signature record and its starting point y coordinate being specified in the fourth byte of the signature record. The subsequent point coordinates of the first stroke are coded in the number bits specified in the first byte of the signature record and stored as the fifth and subsequent bytes (as differences in x and y position from the immediately preceding point) until the entire stroke is coded. The end of the stroke is indicated by an "end mark" point, e.g., in the number of bits specifying a point wherein all of the bits are ones, i.e. the end mark has its maximum value. Alternatively, the end mark may be one byte, and if any bits of the byte immediately preceding such end mark byte are unused in coding x and y coordinate differences, those bit positions are set to zero.

Thus, in the fifth and subsequent bytes, each byte need not correspond to a particular x and/or y coordinate, but all of the bits are utilized to specify differences of x and y coordinates of a present signature point from the immediately preceding signature point, so that no bit positions are unused (except possibly in the last byte representing a stroke in which unused bits are set to zero).

Each subsequent stroke is coded in like manner, i.e. beginning with two bytes specifying the x and y coordinates, respectively, of the starting point thereof, and the specified number of bits thereafter specifying differences of intermediate points until concluding with an end mark, all stored without unused bits in the bytes following the first two bytes thereof, in like manner to that described for the first stroke.

Thus, the first two bytes of a digitized signature record specify the coding conditions for subsequent bytes, and each stroke of the signature follows seriatim in the order signed, each stroke being coded in two bytes specifying the starting point coordinates thereof followed by a number of bytes containing bits specifying differences in the coordinates thereof and ending in an end mark, until all of the strokes of the complete signature are coded. Each coded stroke is characterized by two starting bytes and an end mark between which are interposed bits specifying the locus of the points of the signature, not necessarily in one-to-one correspondence with the bits making up particular bytes.

Because the timing of each of the points of the coded signature is either explicitly or implicitly specified, the dynamic characteristics of the signature, such as stroke timing and/or speed and/or acceleration may be determined from the digitized signature data record, for use in comparisons for identification, verification and/or authentication.

As a result, the digitized signature record described is analogous to a "movie" of the signature, and contains the unique and distinctive dynamic signing characteristics thereof, as contrasted to conventional graphic and image digital signatures which are analogous to a snapshot at one instant in time, i.e. after the complete signature is signed, and lack the unique and distinctive dynamic signing characteristics thereof.

Returning to describing the foregoing in terms of FIG. 6, stylus down 312 first occurs when the signer touches the stylus to the writing surface of the signature pad and movement of the stylus 314 is then detected and point locations are recorded. After each point location recording it is determined 316 whether the stylus is up (i.e. not in contact with the writing surface) or down (i.e. in contact with the writing surface). If stylus up 316 is negative N, then the stylus is on the writing surface and further stylus movement 314 is recorded. This loop 314, 316 repeats so long as stylus up is negative N, i.e. the stylus is in contact with the signing surface.

If stylus up 316 is positive Y, the stylus has been lifted off the writing surface indicating the end of the stroke that began at stylus down 312. Testing for ending of the signing 320 may follow one of several alternative indications. Typically, end of signing is indicated by the signer touching a suitably labeled button displayed on the signature pad device to indicate that he has completed signing his signature. If ending 320 is negative N, then the next stylus down 312 is awaited, and steps 312, 314, 316, 318, 320 repeat as described for each stroke of the signature until ending 320 is indicated positive Y. When ending 320 is positive Y, signature capture 310 is complete and the captured signature data may be produced 330 in a predetermined format. Alternatively and/or additionally, expiration of a predetermined time period can be used to initiate ending 320 path Y so that the signature capture device is not tied up if the signer forgets or neglects to indicate the ending of his signing by touching the button.

Producing signature data 330 initiates the coding described above wherein the recorded coordinates of signature points are coded as differences in coordinate value from a previous point, such as the immediately preceding point, except for the starting point of the stoke. Checking the sampling speed 332 comprises determining the rate at which the signature capture device (signing surface) produces signature point coordinate values and specifying that rate in the second byte of the digitized signature record. Calculating the needed bits 334 for each point of the signature comprises determining the maximum differences in each of the x and y coordinate values between any two contiguous sampled signature points and specifying the number of bits needed to represent such maximum difference. Calculating 334 is preferably performed independently for the x coordinate values and for the y coordinate values.

Finally, compressed signature data is produced 336 as described above with each stroke of the signature specified in two initial bytes locating the starting x and y coordinates and an end mark, between which are coded the differences between adjacent signature points in terms of differences in the x and y coordinate values thereof relative to the immediately preceding signature point. When all of the strokes have been coded in terms defined by the parameters specified in the first two bytes of the digitized signature record for all of the sequence of strokes comprising the signature, method 300 ends 340.

In summary, the signature signed with a pen/stylus on a signature pad or other device is captured with reference to the starting point (location, e.g., coordinates, in terms of, e.g., x, y coordinates) of the signature which is recorded and serves as the reference point for subsequent signature data, at least in the first stroke of the signature. The starting and ending points of each stoke of the signature and of each point of each stroke are recorded relative to a previous signature point as they are signed. Points (locations) along each stroke and segment of the signature, i.e. between each set of stroke starting and ending points, are recorded as they are signed and are coded relative to a previous point. In addition, the timing of the signing of the points of each segment and stoke is also recorded, either expressly or inherently in the location data, by reference to the sampling rate and/or timing.

All of the foregoing are recorded (stored) in a digitized signature data record in the order in which they occur, thereby to produce in essentially real time a locus of points of the signature relative to the previous point of the signature, and the timing thereof. It is noted that this locus-based format of signature data lends itself to mathematical regression, calculation of derivatives and other mathematical manipulation useful for the comparing and authenticating of digitized signatures.

The signature point location and timing data for each stroke of a signature acquired by method 300 render the dynamics of a signature to be determined. E.g., speed can be determined from the distance between points and the recorded times at which the points were made and instantaneous velocity (speed and direction) of a pen stroke may be derived from the sequences and point-to-point spacing or density of each segment of the signature. The tangent of the curvature of a stroke and/or of a segments thereof can be derived from the point location data. Acceleration at any point of a signature may be derived from velocity, if desired. Such characteristics are typically determined by calculating slopes, by regression analysis, and the like.

The timing of the recording of point locations is set at predetermined rates by the processor and controlling software, e.g., at a rate in the range of about 40 to about 120 samples per second. This rate is typically determined by the sampling rate of the signature pad device in combination with the processor or at any desired lower rate, and typically is lower for PDAs and other portable devices.

Preferably, the stored signature coordinate and time data contained in a digitized signature data record is normalized in size and time step length prior to comparison os signature data for identification and/or verification and/or authentication. Normalization may utilize conventional scaling, interpolation and regression methods, thereby to reduce, if not remove, differences that may be caused by the particular equipment utilized to capture the signature and/or the conditions under which the signature was signed.

Dynamic characteristics of the signature comprise at least the following, although less than all characteristics are utilized in a typical signature comparison:

"s" represents the size and shape of the entire signature.

"n" represents the number of strokes in the signature.

"o" represents the order or sequence of strokes of the signature.

"l" represents the number of closed loops of the signature.

"d" represents the distance or length of strokes of the signature.

"t" represents tangents and derivatives of segments and/or points of the signature.

"v" represents the velocity or speed of segments and/or an entire signature, and derivatives thereof.

"p" represents the pressure applied in making the strokes of the signature, if a pressure-sensitive signature pad is employed.

Because different computers and signature capture devices will capture and map signature points at different densities and rates depending, for example, on resolution and/or size of the signing surface, processor operating speed, mouse and/or signature pad sampling rate, the available RAM memory and the like, the captured signature point data is preferably normalized so as to be relatively consistent irrespective of the hardware utilized in its capture. Normalization reduces the effects of differences in the raw signature point data, e.g., the x, y coordinate data, with respect to timing and/or the dimensions of the signing surface and its resolution.

Commonly available personal computers typically perform the capture and generation of digitized signature data, i.e. in the locus based signature format described, in one second or less (excluding signing time) and can make the comparison for authentication in shorter times, e.g., within milliseconds, and can rapidly transmit same via the Internet.

Normalization to any convenient common or "standard" hardware platform is suitable, for example, a Pentium® processor operating at a common speed, such as 233 MHZ or 850 MHZ or the like, and can be based on capturing the speed of the simulation of the mouse device utilized with a particular hardware platform at some time during the signing and signature digitization. (Digital signature pads are often interfaced with the processor in the same or in a similar manner to that of the mouse device.) Normalization facilitates comparison and authentication of digitized signatures captured and generated on different hardware platforms, whether connected directly, by a network, or via the Internet or an Intranet, or other network. As hardware having greater operating speed and/or greater data capability, e.g., a 64-bit processor, become available, the normalization can be adapted thereto as desired and/or as needed. Normalization does not significantly alter the unique and distinguishing dynamic characteristics of a given person's signature, but is believed to tend to reduce the effects of size and hardware on the unique and distinguishing characteristics of the signature.

Figure 7:
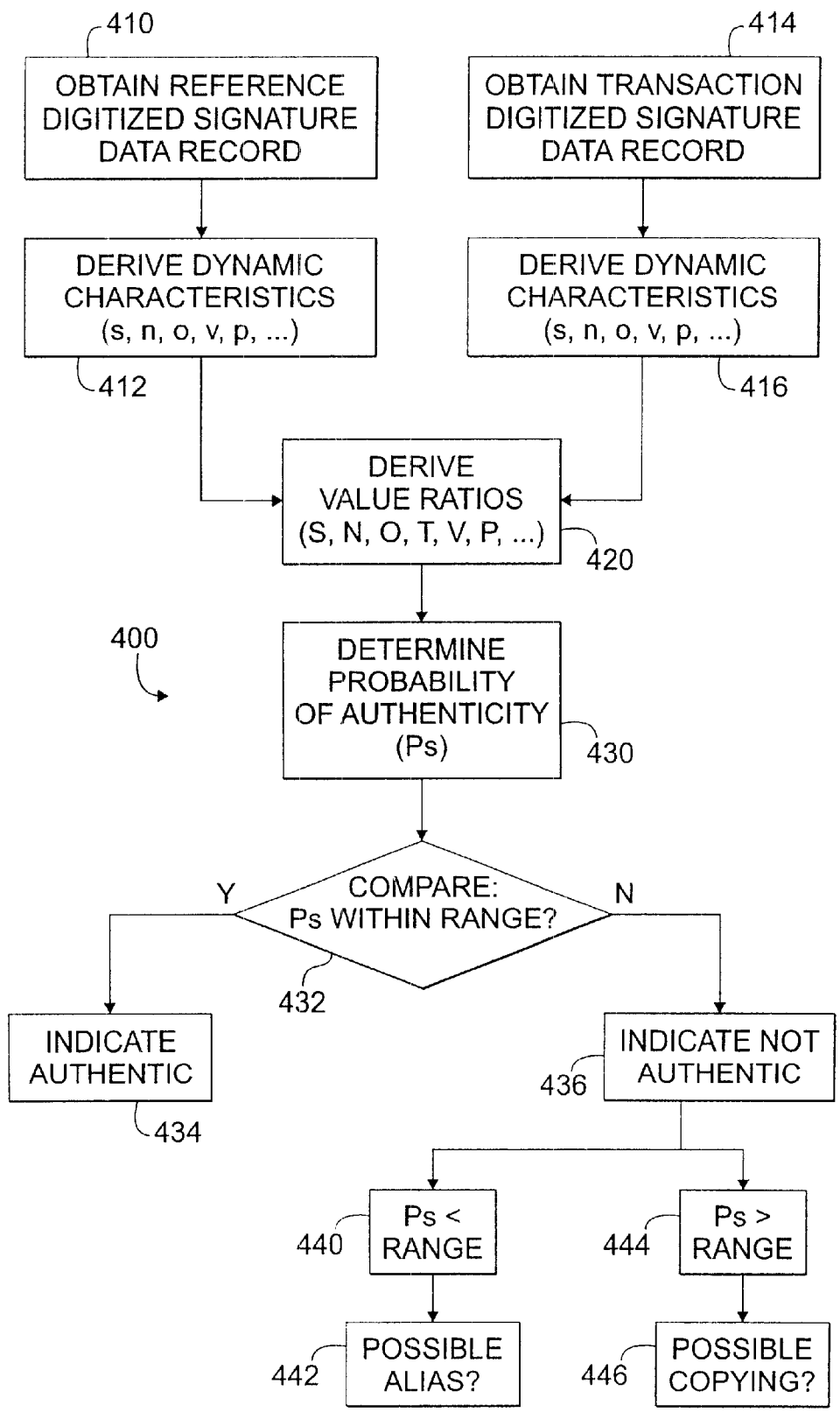
FIG. 7 is a schematic flow diagram illustrating a method for comparing and/or authenticating a digitized signature.

FIG. 7 is a schematic flow diagram illustrating a method 400 for comparing and/or authenticating a locus based digitized signature. A reference digitized signature data record is obtained 410 and the dynamic characteristics (s, n, o, l, d, t, v, p, . . . ) thereof are derived 412, therefrom. Similarly, a digitized signature data record for the present transaction is obtained 414 and the dynamic characteristics (s, n, o, l, d, t, v, p, . . . ) thereof are derived 416 therefrom. Each signature will have a unique set of signature characteristic values that can be compared to the set of characteristic values of another signature to determine whether the two signatures are likely to have been made by the same person.

In making such comparison, a ratio of each respective characteristic value of the two signatures is derived 420, wherein value ratios $S=s_1/s_2$, $N=n_1/n_2$, $O=o_1/o_2$, and so forth, with the smaller value being the numerator and the larger value being the denominator so that each ratio is unity or less. It is noted that each ratio will be closer to unity as the similarity of that characteristic of the two signatures increases, i.e. where the two signatures are closer to being the same, and will be lesser in value as the similarity of that characteristic of the two signatures diminishes, i.e. the two signatures are more dissimilar.

The probability $P_S$ that two signatures are the same is determined 430, wherein the probability $P_S$ can be represented by the product expression:

$$P_S = S^\alpha N^\beta O^\chi L^\gamma D^\lambda T^\delta V^\epsilon P^\phi$$

wherein $\alpha$, $\beta$, $\chi$, $\gamma$, $\lambda$, $\delta$, $\epsilon$, and $\phi$ are weighting factors for each of the characteristic value ratios S, N, O, L, D, T, V and P, respectively. Greater weight is accorded to any given value ratio by making its weighting factor greater than unity. For example, where the speed value ratio S and the tangent value ratio T are deemed of greater importance as indicators discriminating an authentic signature from a bogus, forged or other non-authentic signature, their respective weighting factors $\alpha$ and $\delta$ may be increased to a value as high as two or three. If two signatures are exactly identical (practically an impossibility except for an electronic copy), then each ratio S, N, O, L, D, T, V and P will be unity and $P_S=1$. If two signatures are completely dissimilar, then each ratio S, N, O, L, D, T, V and P will become small (approaching zero) and $P_S$ will approach zero.

Authenticating a signature comprises comparing the characteristic values thereof to the characteristic values of an exemplar or standard or reference digitized signature record (or any previous digitized signature data) using the foregoing ratios to produce a $P_S$ for the two signatures being the same. Specifically, the probability $P_S$ value is compared 432 to a predetermined range of values deemed indicative of authenticity. If the probability $P_S$ is within the predetermined range, then comparison 432 is positive and the yes Y result obtains wherein an indication of authenticity is provided 434. If the probability $P_S$ is not within the predetermined range, then comparison 432 result is negative and the no N result obtains wherein an indication of non-authenticity is provided 436.

Typically, the value of $P_S$ required for indicating authenticity is about 0.5 (about 50% relative match) or greater, however, a value of $P_S$ that is too high 444 indicates a probability that the signature has been copied or produced electronically 446, i.e. is not signed by the same person. Thus, values of $P_S$ indicating authenticity are usually a range, for example, a range of 0.45 to 0.75 (45–75% relative match) has been found satisfactory for one application to voter registration. Values of $P_S$ less than about 0.30 (about 30% relative match) are likely to indicate a forgery and values of $P_S$ greater than 0.8 (about 80–100% relative match) are most likely to indicate an electronic forgery. For signatures with values of $P_S$ in the range of 0.30–0.45 (about 30–45% relative match), the signer may be requested to again sign his signature for one or more additional tries for verification and/or authentication. Examples of values of $P_S$ that may be utilized as thresholds indicative of authenticity include values of about 0.45, about 0.5, about 0.6, about 0.7, about 0.75 and about 0.8, and examples of values thereof that may be utilized as thresholds indicative of dissimilarity include values of about 0.45, about 0.4, about 0.3, about 0.25 and about 0.2.

Where it is desired to indicate or display to an authenticator or verifier or to another person the results of the authentication comparison, such as the percent relative match, it may be desirable to adjust the calculated value of $P_S$ so that a standardized range of values are presented. Such adjustment or transformation from the calculated values of $P_S$ to the displayed values of $P_S$ may be proportional or not, and/or may be linear or non-linear, and may be implemented, e.g., by multiplication by a scaling factor or a factor obtained by table look up. Typically, the threshold values and ranges are determined on a sliding scale depending on the degree of certainty desired for a particular authentication or identification, and are adjusted so as to be between zero and one (i.e. 0–1.0).

It is desirable to avoid authentication errors, i.e. indications of authenticity for two signatures signed by different persons and/or indications of lack of authenticity for two signatures signed by the same person. Errors of the first sort tend to increase as the lower limit of the range for $P_S$ is reduced to too low a value. Errors of the latter sort tend to increase as the lower limit for the range of $P_S$ is increased to too high a value or if the upper limit thereof is reduced to too low a value. As the consequences of an authentication error become more serious, e.g., as between a credit card transaction of value less than $25 and access to a government classified facility, the range of values of $P_S$ accepted as authenticating two signatures may be both raised and narrowed. Even for transactions of the same type, the range of values of $P_S$ accepted as authenticating two signatures may be changed to more closely suit the circumstances, e.g., setting a higher and narrower range for credit card transactions valued at over $500, than for transactions of lesser value. In fact, the range of values of $P_S$ accepted as authenticating two signatures may be specifically adjusted as a function of the value of the transaction.

Evaluations have indicated that at least two different ratios of characteristic values should be employed in a signature authentication, e.g., so as to provide a probability $P_S$ that is meaningful indicator of authenticity of digitized signature. For example, the factor ratios V for the relative speeds of the segments and/or stokes of a signature and T for the relative tangents thereof were found to be of more significance in discriminating between authentic signatures and non-authentic signatures. In particular, where a signature is signed by tracing with the stylus an authentic signature placed on the signing surface of the signature pad device, the derivatives of speed ratio V (or acceleration characteristics) are significant in distinguishing authentic and non-authentic signatures. A combination of both the acceleration and the instantaneous speed of the stylus at one or more particular segments of a signature tends to provide distinctiveness to the signature as signed by a particular person, and so while requiring more mathematical manipulation, may be advantageously utilized in authenticating a signature, e.g., as in a more important utilization of digitized signature authentication.

In another example, the factor ratios S for shape and size and T for tangents were found to be of more significance in discriminating between authentic signatures and non-authentic signatures, although such may not always be the case and may not be the case for signatures using non-English alphabet characters.

It is noted that the foregoing authentication may be useful is detecting signatures made by the same person using other than the person's true name. Because the alias may be used less frequently, especially for signed transactions, there may be a lesser value for $P_S$ produced 440 for the alias signature than for a true name signature, and monitoring for values of $P_S$ slightly below the lower limit of the range for authentication may facilitate detection 442 of such signing of aliases. For example, where the range of $P_S$ for digitized signature authentication is 0.45–0.80, the range of $P_S$ for investigating possible alias use may be 0.0–0.3, on the same relative scale. An example of this sort of circumstance may be where a person seeks to vote plural times using his true name and one or more aliases, or where the person is a practiced forger of a signature. Digitized signatures based upon the dynamic characteristics of the signature can be more discriminating than are image-based signatures which may look alike after the fact, but are very different dynamically when signed.

It is further noted that a digitized signature according to the invention includes the dynamic biometric information of the person signing and so, because the essential information is stored in the digitized signature data record, the factors considered and the weighting applied thereto in comparing and/or authenticating such digitized signature may be changed and/or improved even after the signature is captured and the digitized signature data record generated. For example, if it is later desired to improve the verification process by considering different and/or additional characteristics, such as the acceleration of the pen strokes, the verification/authentication process can be changed and the pre-existing digitized signature data may be utilized therewith, i.e. there is no need to secure a new signature for such comparison. Such is not the case for prior art digitized signature schemes which are based on averaged or statistical signature characteristics and which are believed to require re-enrollment or re-registration in order to acquire additional signatures for comparison in an improved authentication process.

Further, the present invention may be employed for comparing plural digitized signatures previously captured and generated to a present signature for verification and/or authentication. In such comparison, it is preferred that each prior digitized signature data record is separately compared to the present digitized signature, and that the results of such plural comparisons be utilized according to a predetermined protocol for determining authenticity or the lack thereof. For example, because a person's signature may change over time, e.g., due to aging, illness, physical changes and the like, comparisons to more recent known authentic digitized signature data records for that person may be given greater weight in the authentication protocol. Such protocol may require that all or less than all comparisons produce a $P_S$ within a range of values indicative of authenticity, and the range of values of $P_S$ deemed authentic may differ for more recent and less recent digitized signature data.

A protocol for comparing a transaction signature to plural standard signatures of the same person accumulated over a period of time may include first comparing the transaction signature with the most recent reference signature first, then comparing it with the second most recent signature, and so forth, and comparing it with the oldest reference signature last. Greater weight may be given to comparisons with more recent reference signatures or the same weight may be given to all comparisons, however, any desired weighting protocol may be utilized. Alternatively, once an image signature in bitmap format is produced, it may easily be translated or converted into any other standard format, e.g., TIFF and JPEG, by conventional means.

Figure 8A:
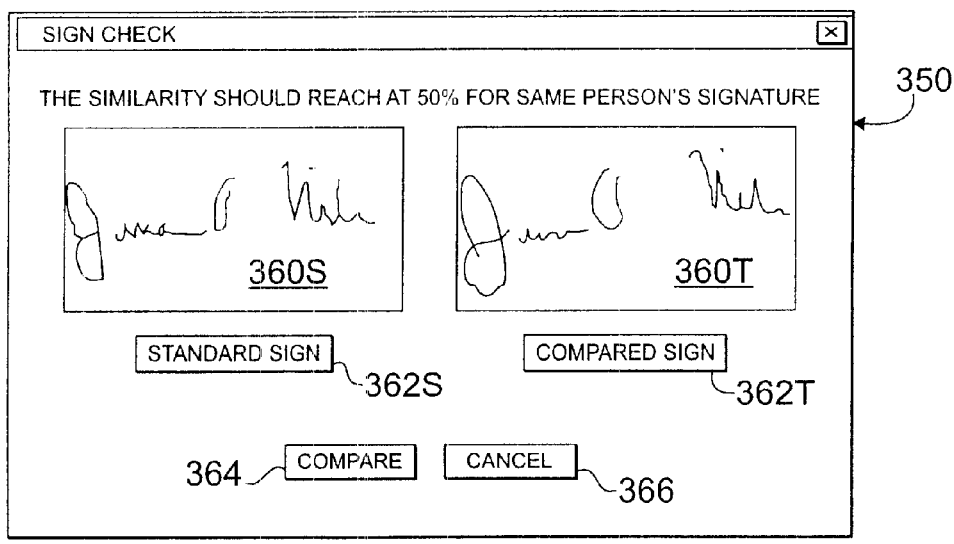
FIGS. 8A through 8D illustrate examples of screen displays useful with the digitized signature apparatus and method described.

FIGS. 8A through 8D illustrate examples of screen displays useful with the digitized signature apparatus and method described. FIG. 8A illustrates a screen display 350 including two windows 360S and 360T wherein are displayed a standard or reference signature and a transaction signature, respectively, such as would be displayed after a person has accessed a locus-based digitized signature application and has signed his signature in connection with a transaction. The signature displayed in window 360S represents an image representation derived from a locus-based digitized signature previously captured and window 360T represents an image representation derived from a locus-based digitized signature presently captured and which is to be authenticated by comparison to the standard locus-based digitized signature. Windows 360S, 360T are identified by labels 362S, 362T, respectively. Clicking "Compare" button 364 initiates the comparison of the standard and transaction signatures and enables the signature pad or other device for the next transaction, e.g., alternatively clicking a "Submit" button or a "Process Transaction" button in transaction signature and enables the signature pad or other signature device for the signer to again sign his signature. Optionally, if neither the "Compare" or the "Cancel" button is activated within a predetermined time, then the process may "time out" to clear or reset the signature device and processor in preparation for another transaction, or may display a prompt for the person to take the next action, and allow time for him to do so, before timing out.

Figure 8B:
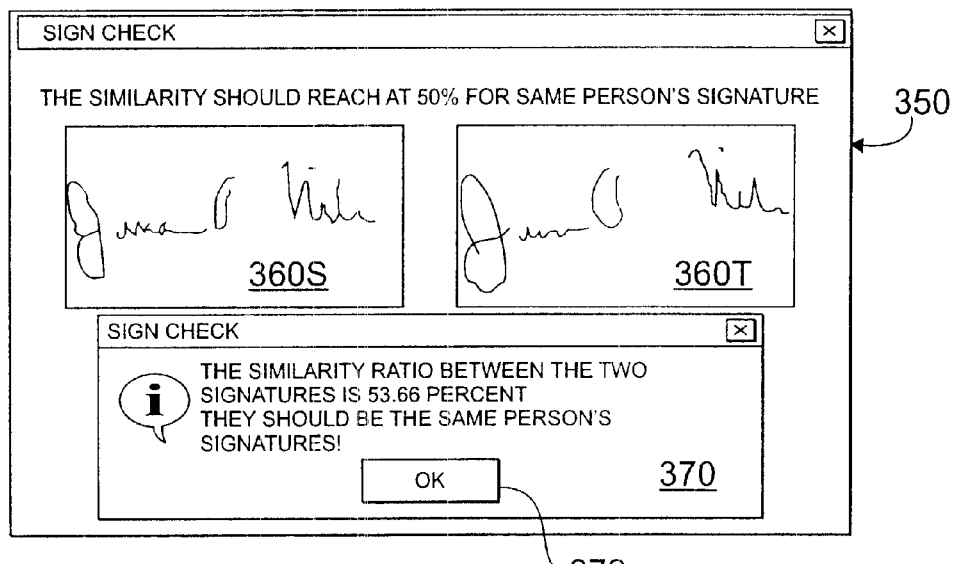

FIG. 8B illustrates screen display 350 after "Compare" button 364 has been activated to initiate comparison of the standard locus-based digitized signature and the transaction locus-based digitized signature in the case where the authentication process has determined that the two signatures are a match, i.e. are authentic. An overlay window 370 is displayed to indicate that the result of authentication is a positive match and that the transaction signature is likely signed by the same person who signed the standard signature. Optionally, the result of the authentication process may be displayed, e.g., as a percentage representative of the probability $P_S$ determined in the authentication process. An "OK" 372 is provided to remove window 370 and take the user to the next screen.

Figure 8C:
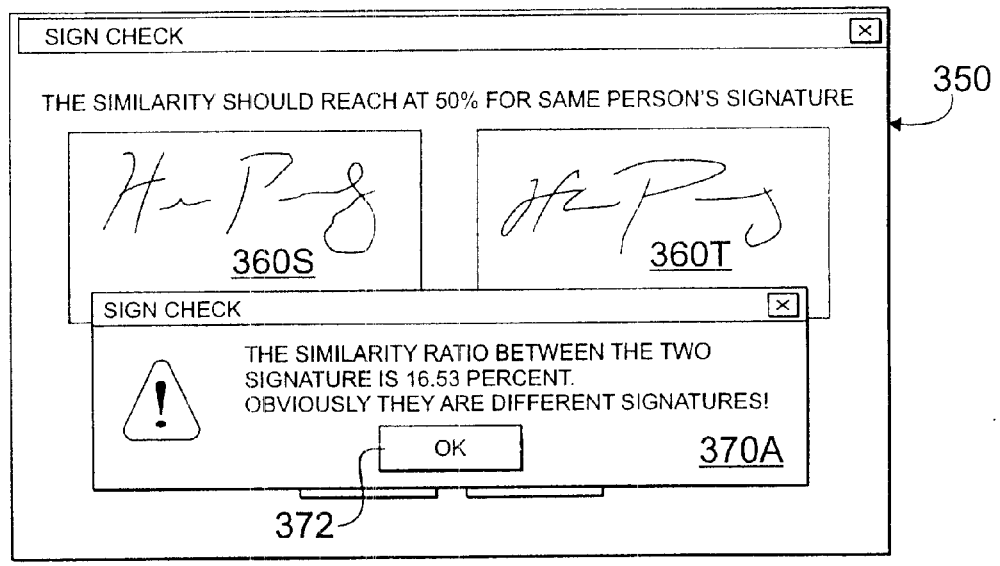

FIG. 8C illustrates screen display 350 after "Compare" button 364 has been activated to initiate comparison of the standard locus-based digitized signature and the transaction locus-based digitized signature in the case where the authentication process has determined that the two signatures are not a match, i.e. are not authentic. An overlay window 370A is displayed to indicate that the result of authentication is negative and that the transaction signature is not likely signed by the same person who signed the standard signature. Optionally, the result of the authentication process may be displayed, e.g., as a percentage representative of the probability $P_S$ determined in the authentication process. An "OK" 372 is provided to remove window 370A and take the user to the next screen.

Figure 8D:
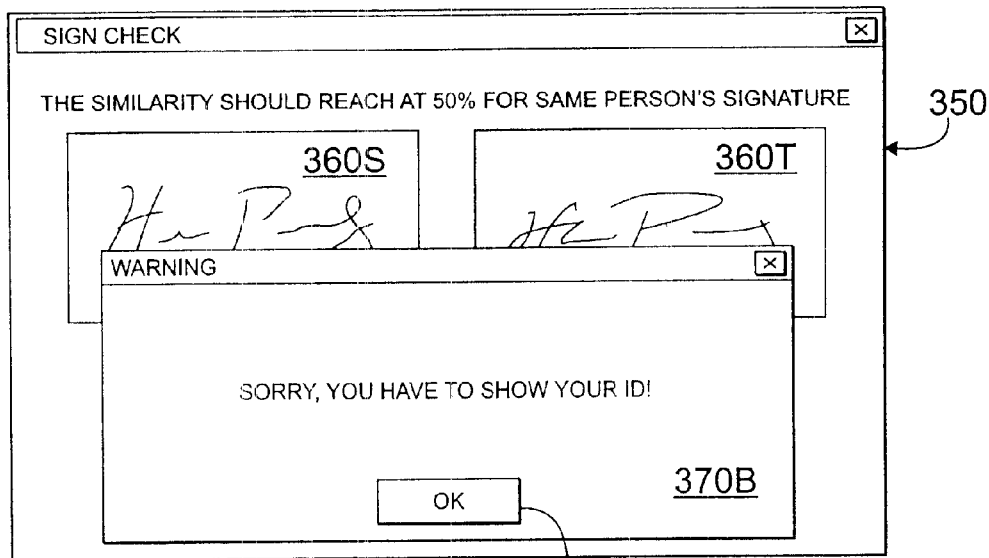

FIG. 8D illustrates screen display 350 after "Compare" button 364 has been activated to initiate comparison of the standard locus-based digitized signature and the transaction locus-based digitized signature in the case where the authentication process has determined a probability $P_S$ that is too low to indicate that the two signatures are a match and is too high to indicate that the two signatures are not a match, i.e. the transaction signature may or may not be authentic. An overlay window 370B is displayed to indicate that the result of authentication is not a positive match and/or that the transaction signature may or may not have been signed by the same person who signed the standard signature. Optionally, window 370B may direct further alternative and/or additional steps for attempting to authenticate the person's identity and complete the transaction, such as requesting that the person show identification (ID). The result of the authentication process may or may not be displayed, e.g., as a percentage representative of the probability $P_S$ determined in the authentication process. An "OK" 372 is provided to remove window 370B and take the user to the next screen.

Figure 9:
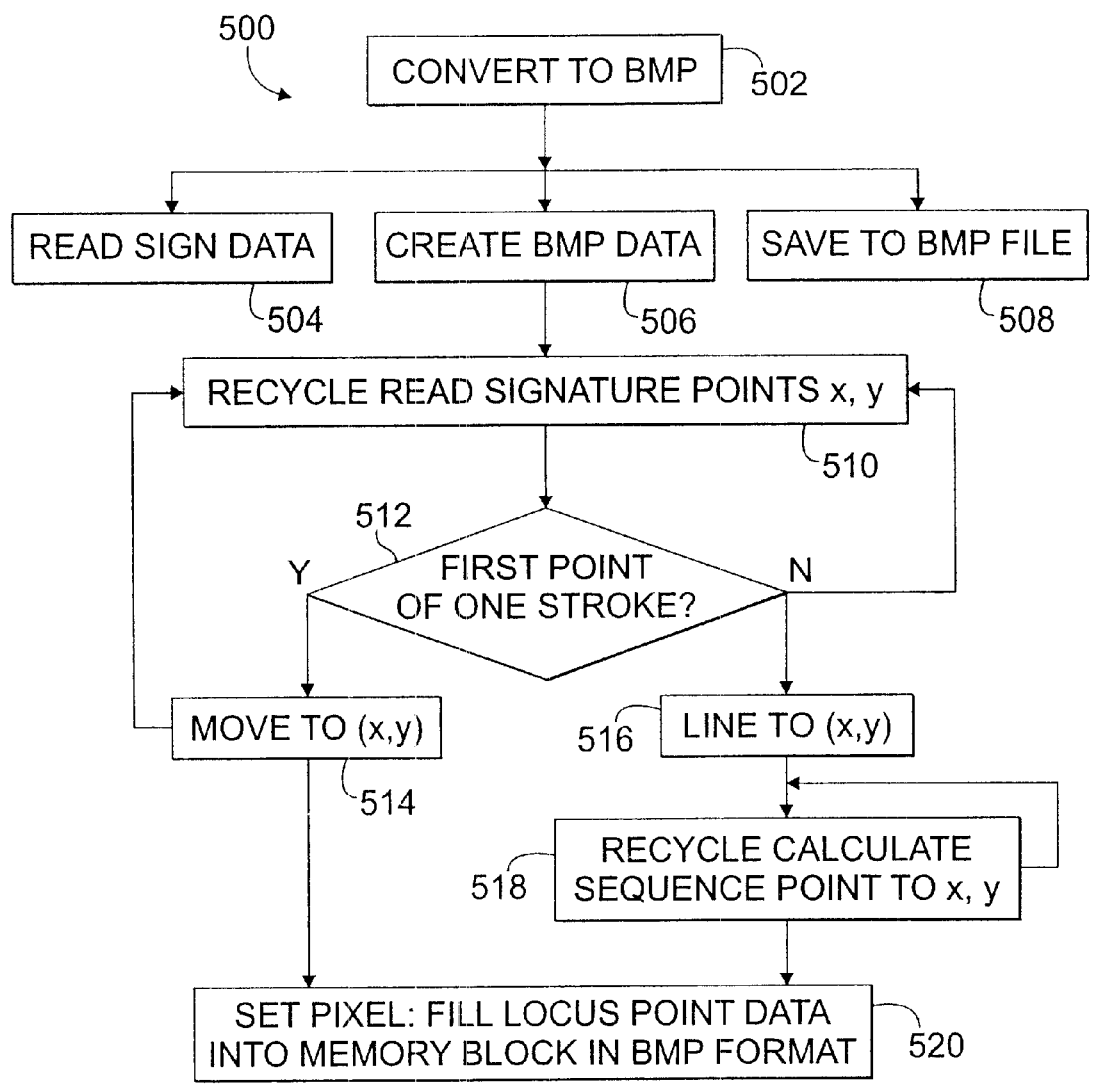
FIG. 9 is a schematic flow diagram illustrating a method for reproducing a digitized signature.

FIG. 9 is a schematic flow diagram illustrating a method 500 for reproducing a digitized signature in an image or graphic format from a locus-based digitized signature data record. In an image or graphic format, the digitized signature may be viewed by any one of many common viewers for providing a visual representation of the digitized signature. This feature of the invention is advantageous in that a digitized signature captured in the locus-based format may be converted into a format that may easily be viewed, printed or used in a conventional application without substantial loss of shape or detail, however, the size of the digitized signature data record in the locus-based format according to the invention is significantly smaller than is the equivalent signature data in an image or graphic format. The conversion to image format exemplified in method 500 may include scaling to either a larger or smaller size. In the example of FIG. 9, the image format is a bitmap format, i.e. a file having a ".bmp" extension, however, any desired format, e.g., the TIFF or JPEG formats, could be produced.

Converting 502 locus-based digitized signature data to bitmap ".bmp" format initiates the reading 504 of the signed data, i.e. the locus-based digitized signature data for use in creating bitmap data 506, and ultimately to save 508 the data when transformed to bitmap data format as a bitmap ".bmp" file. Creating 506 bitmap data comprises a repetitive process of converting locus-based digitized signature points into bitmap pixels. The method begins at a point location (x,y) and advances through the point locations (x,y) until all are processed or transformed into pixels in bitmap format.

For example, the initial or starting point location (x,y) of the locus-based digitized signature is read 510 and is then determined 512 whether it is the first point of a signature stroke. If the point is the first point of a signature stroke, a positive result Y, the point location moves 514 to that point location (x,y) and two things happen: (i) the pixel is set 520 to fill the locus point data into a memory block in bitmap format and (ii) the point location recycles to read 510 the next location (x,y) in the locus signature data. If the point is not the first point of a signature stroke, a negative result N, two things happen: (i) the point indicates 518 a line from the previous point location to the present point location (x,y) and (ii) the point location recycles to read 510 the next location (x,y) of the locus signature data. The line is calculated 518 on a recycling basis to define the sequence of points representing the line and the pixels thereof are set 520 to fill the locus point data for the line (i.e. the sequence of points) into the memory block in bitmap format It is noted that because the locus-based digitized signature data includes all the point locations of the signature, only the signature point locations need be processed and converted into the desired image format (all other locations are background), and so the conversion process is relatively efficient. It is also noted that while the point location data of the locus-based digitized signature will reproduce an exact replica of the original signature (at least within the resolution limitations of the signature pad or other device utilized to capture the signature data), once the conversion is made all of the dynamic biometric data (e.g., the timing, speed, sequence of strokes and/or pressure) relating to the signature is lost and the locus-based digital signature data cannot be retrieved or derived or otherwise obtained from the image data.

Even if the image data were to be converted into a locus of points by making certain assumptions concerning the order and sequence of the strokes, in addition to possible errors in the assumed order of the strokes of the signature, the dynamic biometric data (e.g., the timing, speed, sequence of strokes and/or pressure) is unrecoverable and an exact digitized signature cannot be derived. For example, one cannot determine from the image when in making the signature the letter "t" is crossed and the letter "i" is dotted. Thus, the locus-based digitized signature is relatively secure because it cannot be reproduced (e.g., forged or otherwise used without authorization) from a digital image signature. Typically, values of $P_S$ of about 0.8 or greater usually indicates a signature has been electronically copied, e.g., is or should be considered to be a suspected electronic forgery.

The only way one can copy the locus-based digitized signature record is to intercept it while it is being transmitted from the signature capture device to the server on which digitized signature records are stored in a database, and such transmissions are preferably encrypted and associated with Internet server time/date data. Attempting to use such intercepted digitized signature data would produce a comparison wherein the probability value $P_S$ is too high for authentication, even if the signature data is perturbed in some way to try to avoid it being an exact copy.

Figure 10:
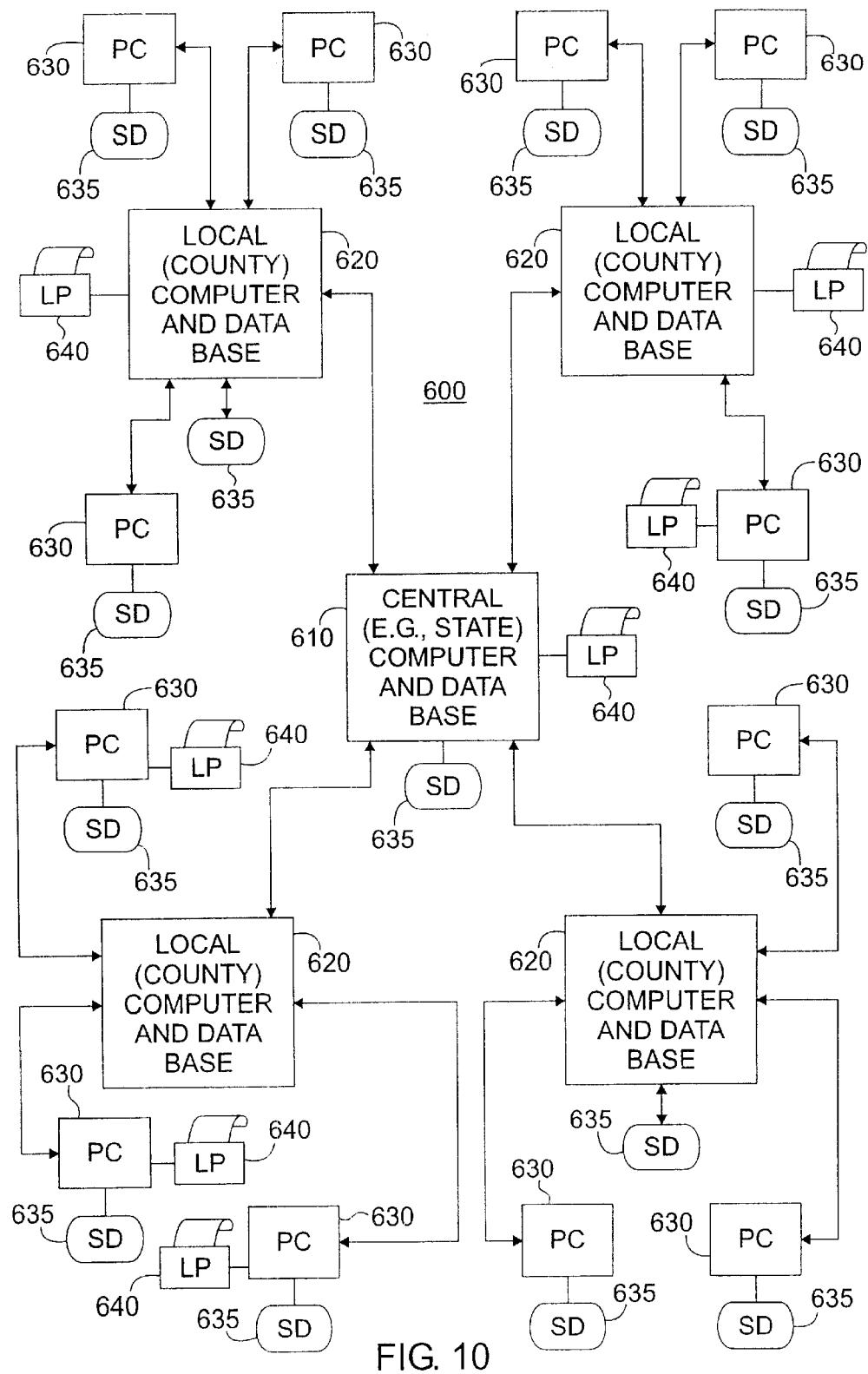
FIG. 10 is a schematic block diagram of apparatus for capturing and generating a digitized signature and for verifying same in relation to a transaction.

FIG. 10 is a schematic block diagram of example apparatus 600 for capturing and generating a digitized signature and for verifying same in relation to a transaction. Example apparatus 600 is illustrated as including a cental computer or server 610 in which resides a database in which digitized signature records including locus-based digitized signature data are stored and preferably are indexed. Central server 610 is in communication (represented by double-ended arrows) with one or more (typically a plurality of) local computers or servers 620, typically located at sites remote from central server 610. Each of the local or distributed computers and servers 620 may optionally include a database in which digitized signature records including locus-based digitized signature data is stored, such as a subset of the records of the database of central server 610.

Each of the local or distributed computers and servers 620 is in turn in communication with one or more (typically a plurality of) computers 630, such as personal computers and/or laptop computers, typically located at sites remote from local server 620 and/or at least apart therefrom at the same site. A signature capture device SD 365, such as a signature pad, a PDA and the like, is typically associated with each of computers 630 for the signing of signatures thereon to produce in cooperation with computer 630 locus-based digitized signature data.

Computer 630 generates a digitized signature data record, e.g., as described above in relation to FIG. 3, utilizing the locus-based digitized signature data captured by device SD 365 and computer 630, and transmits the digitized signature record to local server 620 which in turn communicates the digitized signature record to central server 610. If the digitized signature record is new, it may be added to the digitized signature database, and if it is a signature relating to a transaction, it my be compared to digitized signature data in such databases for verification and/o authentication. A signature capture device 365 may likewise be associated with a local computer 620 for producing locus-based digitized signature records therewith.

In the context of voter registration, for example, apparatus 600 may be employed to register voters and/or to request and/or make changes and adjustments to voter records and information at any of the locations where one of computers 610, 620, 630 and an associated signature device SD 365 is located. Additionally and/or alternatively, computers 620 and/or 630 may be voting machines or may run voting machine software so as to permit voting from such locations. In the voting context, locus-based digitized signature capture and authentication may be utilized for verification of the identity of voters and of their being properly registered to vote, as well as for assisting in the detection of persons attempting to vote more than once or in the place of a registered voter, either locally or anywhere in the jurisdictions included in the databases in local (e.g., county) computers 620 and/or in the cental (e.g., state) computer 610.

In voting and/or vote registration, a printer LP 640 may be associated with any one ore more of computers 630, 620 and/or 610 for printing a record of information and/or a transaction conducted on such computer. If required by law that registration applications and/or changes to voter information be recorded on a paper document or other record, printer 640 prints such document or record, such as a voter registration form or a provisional or absentee ballot, which can then be signed with an original ink signature to meet the legal requirement, in addition to the electronic record including a locus-based digitized signature. If a particular voter does not want to use a digitized signature for registration or another transaction, then the document or record provided by printer 640 may be signed with an original ink signature without the electronic record being signed with a digitized signature. In either case, the signed paper document or other record may be submitted at the location or by mail, as appropriate.

Communication (represented by double-ended arrows) among various ones of computers 610, 620, 630 may be via any convenient communication link, including but not limited to, wire and cable, telephone system, optical fiber, optical transmission, radio or other RF transmission, network, LAN, WAN, an Intranet, the Internet, and the like. Each registration location and/or polling place thus has essentially direct and immediate access to the digitized signature and other records stored in databases at higher jurisdictions, e.g., voter registration databases at county and state levels.

Where such access is via the Internet and/or world wide web, the only communication facility needed at any location is a conventional telephone line to connect to the modem of computers 620 and/or 630. Thus computers 630 may be computers resident at or laptop computers transported to any desired location, such as libraries, schools, vehicle registration and/or inspection sites, police stations, municipal facilities, government offices, military bases, shopping centers, or any other location where it is desired to register voters and/or conduct voting. Where a computer 630 is already in place at a location, e.g., as is common for a library, and lacks a signature device 365, only a signature device SD 365 need be transported to conduct registration and/or voting at such location. Alternatively, a user could check out or borrow a signature pad from a library and/or government office for registering from any computer having Internet access, e.g., at a home or at a work place In certain applications it is relatively easy to quickly retrieve the reference or standard digitized signature from a digitized signature database because the person enters his name or an identifying number under which he has registered or enrolled, thereby identifying himself relative to his standard signature. In other applications, however, it may be desired to compare digitized signatures without knowing the identity of the signer, as may be the case, for example, for the system and method described in U.S. patent application Ser. No. 10/127,787 (Applicants' AI-TECH-32) entitled-"VOTING FRAUD DETECTION SYSTEM AND METHOD" filed by Kevin Kwong-Tai Chung on even date herewith which is hereby incorporated herein by reference in its entirety. The number of comparisons required before the desired standard digitized signature data is identified and retrieved can be come quite large and require substantial time, particularly where the number of records in the database is large. For example, voter and credit card databases could have many millions of digitized signature data records therein.

In such instances, finding the standard or reference digitized signature and/or identifying the person signing a signature is facilitated by indexing of the digitized signature data records. Indexing the digitized signature data records is typically based upon the characteristics of the digitized signature. For indexing numerical values, one convenient indexing arrangement includes dividing a range of values that may form a continuum into a number of bands or quantization levels. Typically, the bands or levels are non-overlapping and divide the continuum in to a manageable and/or convenient number of groups or bands, e.g., a value that may range between zero and ten may be quantized into bands of 0–1, 1–2, 2–3, and so forth, or may simply be rounded to the nearest integer value. Characteristics useful for providing an index or catalog include, for example:

- The number of strokes and dots in the signature (dots are strokes where the starting and ending points are the same or so close together as to essentially be a point, such as in the letters "i" and "j" or in a punctuation "period").
- The relative lengths of the strokes taken in sequence. E.g., the length can be categorized to the nearest integer number of centimeters (for indexing, n cm±0.5 cm=n cm, where "n" is an integer), and dots are less than 0.1 cm.
- The number of closed loops in each stroke. E.g., closed loops may occur in script letters such as "b", "e", "l" "o" and so forth.
- The relative ratio of the length of the signature to its height. E.g., the ratio X/Y rounded to the nearest integer (1±0.5=1, 2±0.5=2, . . . ).
- The total normalized length of the signature, i.e. the cumulative length of all the stokes of the signature. This may also be categorized to the nearest integer number of centimeters.
- The relative speed of completing the signature, i.e. the total time the signer takes to sign his signature from initial touching of the stylus to the signature pad to the final lifting of the stylus. Time may be categorized, for example, to the nearest whole second or two seconds.
- Other characteristics of the signature, such as the derived values of tangents of one or more specific segments (e.g., a midpoints of closed loops), the instantaneous speed of one or more specific segments (e.g., midpoints of a stroke, instantaneous acceleration at a specific segment, and the like.

For those indexing characteristics relating to size, the dimension preferred for indexing is that after the signature is normalized for size and tilt. It is also desirable that the sizes of the categories or quantization not be too fine so as to allow for reasonable and typical variations and fluctuations in a person's signature, especially for the effects of signing position, comfort, pen weight and size and the like. In general, increasing the number of signature characteristics characterized by the index value will tend to shorten the time required to search a database and retrieve the digitized signatures therein having matching index values. This generally obtains because the number of records in each subset corresponding to a particular index value decreases as the number of characteristics indexed increases, i.e. there are a larger number of subsets each including a smaller number of digitized signature records.

It is noted that plural signatures may be retrieved from the digitized signature data base based upon the index value and those signatures may then be compared to the transaction digitized signature for authentication and, if desired, additional information and/or identification may be requested to eliminate any ambiguity and identify a specific person.

Where each category of each indexed characteristic is represented by an alphanumeric character, then the index value for the digitized signature is simply the string of applicable alphanumeric characters in a predetermined order of the indexed characteristics. Matching the transaction digitized signature to the digitized signature records in the data involves determining the index value for the transaction digitized signature and retrieving the digitized signature records having index values that match the index value of the transaction digitized signature.

It is noted that a further advantage of the described digitized signature record requiring 100–300 bytes, as compared to a conventional digital signature file of 2–3 kilobytes, is that the time required to transmit the digitized signature record is similarly dramatically smaller. Where many digitized signature records are retrieved over a communication link via a typical 56-kilobyte per second modem, the difference in the size of the signature record may make the difference between the time needed to process a transaction being satisfactory and unsatisfactory. At the server, many more queries can be received and responded to in any given time and with a particular server configuration where the record size is typically 300 bytes as compared to 3000 bytes, and up to 30–60 kilobytes for color image or graphic files.

Figure 11:
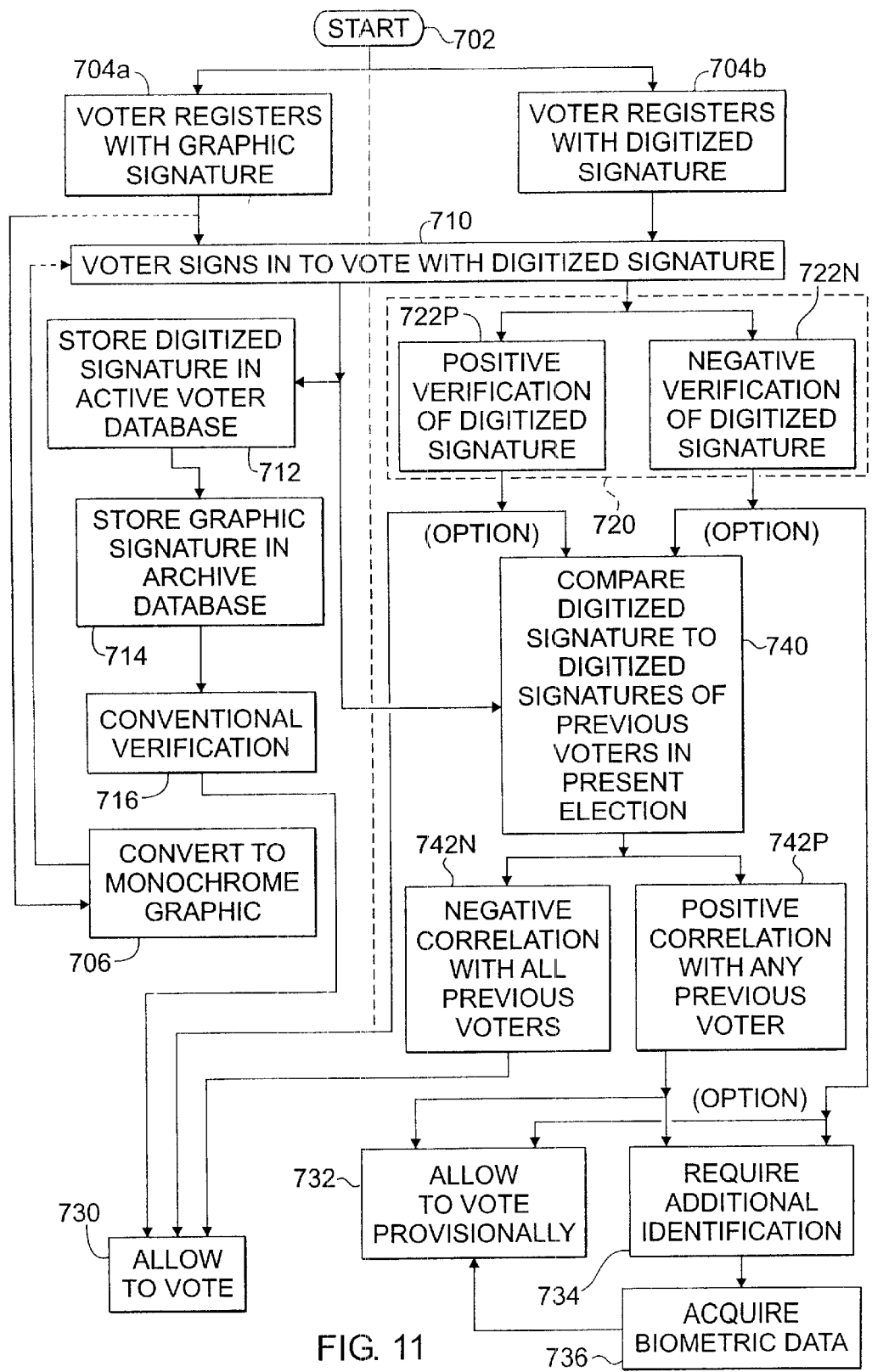
FIG. 11 is a schematic flow diagram illustrating a voting arrangement employing digitized signatures.

FIG. 11 is a schematic flow diagram illustrating an example voting arrangement 700 employing digitized signatures. Voting process 700 starts 702 with a voter being previously registered to vote with either a conventional graphic or image-based digitized signature 704*a* or with a locus-based digitized signature 704*b*. On the day(s) of the election, a voter signs in to vote 710 at a polling place by providing a signature that is captured as a locus-based digitized signature as described herein. Such locus-based digitized signature is sometimes referred to as a "signature dynamics" signature and/or a D-SIGN™ signature (a trademark of AI Technology, Inc.). Process 700 thereafter may take one of several paths depending upon the previous registration arrangement and the current registration and/or voting arrangement.

Where the previous voting arrangement utilizes graphic or image-based digitized signatures, the locus-based digitized signature is stored and replaces 712 the graphic signature in the database of active voters and the graphic digitized signature is stored or archived 714 to an archive database. Thus, the graphical signature based voter registration database is gradually replaced or converted to a locus-based digitized signature database as each voter votes. Optionally, the voter's identification may be verified 716 by conventional means and the voter is allowed to vote 730. The foregoing builds a voter database of locus-based digitized signature records as each voter votes and so is suitable for conversion from a database of conventional graphic signatures to a database of locus-based digitized signature records. Optionally, where the database of graphic signatures has such signatures stored as color or "gray-scale-rich" graphical images, e.g., in TIFF or BMP bitmap formats, which require about 20–80 kilobytes of memory each, conversion 706 thereof to a "monochrome" representation which may reduce the size of the record to about 2–8 kilobytes at any time prior to archiving 712 will substantially reduce the storage capacity of the hardware and/or storage media required for storing such records.

Where the previous voting arrangement does not utilize digitized signatures, the locus-based digitized signature is captured and stored 712 in the database of active voters as each voter next votes and the graphic digitized signature is archived 714 to an archive database. Thus, the conventional voter registration database is gradually replaced or converted to a locus-based digitized signature database as each voter votes, or at least a locus-based digitized signature database is developed in parallel.

Where the previous voting arrangement utilizes locus-based digitized signatures, the locus-based digitized signature captured as each voter signs in to vote is utilized for verifying 720 the voter's identity and registration to vote by comparing the then captured locus-based digitized signature and the locus-based digitized signature stored in the database of active voters. Upon positive verification 722P, i.e. the comparison of the transaction digitized signature captured at the polling place is authenticated against the standard digitized signature retrieved from the database of active voters, the voter is allowed to vote 730. In the case of negative verification, i.e. the comparison of the transaction digitized signature captured at the polling place is not authenticated against the standard digitized signature retrieved from the database of active voters, the voter is not allowed to vote 730, but may be allowed to vote provisionally 732 and additional identification may optionally be required 734.

In any of the foregoing cases, it is preferred that the digitize signature captured 710 from the present voter at sign in be compared or correlated 740 to the digitized signatures of all voters who have previously signed in to vote in the same election. If comparison 740 produces a negative correlation 742N with the digitized signatures of all previous voters, then there is no attempt by that voter to vote more than once and he is allowed to vote 730. If comparison 740 produces a positive correlation 742P with the digitized signatures of all previous voters, then there may be an attempt by that voter to vote more than once and he is not allowed to vote 730, but may optionally be allowed to vote provisionally 734. Optionally, where another biometric in addition to a digitized signature is captured upon voter sign in, such secondary biometric data may be acquired 736 from the present voter and stored for later investigation or displayed for immediate comparison with a like biometric captured earlier when the person whose signature positively correlated with that of the present voter signed in, as described in application Ser. No. 10/127,787 (AI-TECH-32) referred to herein above.

It is understood that the method and apparatus for generating a digitized signature and/or for verifying a digitized signature may find application and/or be employed in many different transactions and environments. Examples thereof include but are not limited to voting, voter registration, debit and credit card transactions, banking and other financial transactions, insurance transactions, Internet and other "e-commerce" transactions, security and access control, military, defense and government, manufacturing, wholesaling, distributing and retailing, medical treatment and pharmacy, and any other where it is desired or necessary to verify the identity of a person with appropriately probability. Herein, "transaction" generally refers to any of the foregoing and "person" generally refers to any person or persons making, engaging in or seeking to make or engage in a transaction. While any particular example or embodiment herein may be described with reference to a particular context, environment or transaction, e.g., voter registration and voting, the apparatus and method are not limited to such contexts, environments and/or transactions.

The present invention can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the invention. Storage media for containing such computer program include, for example, floppy disks and diskettes, compact disks (CD)-ROMs (whether or not writeable), DVD digital disks, RAM and ROM memories, computer hard drives and back-up drives, and any other storage medium readable by a computer. The invention can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the invention. The invention may be implemented on a general purpose microprocessor or on a digital processor specifically configured to practice the invention. When a general-purpose microprocessor is employed, the computer program code configures the circuitry of the microprocessor to create specific logic circuit arrangements.

While the present invention has been described in terms of the foregoing exemplary embodiments, variations within the scope and spirit of the present invention as defined by the claims following will be apparent to those skilled in the art. For example, other biometric data, such as fingerprint, palm print, hand and/or facial geometry, iris, retinal or other eye scans and prints, and the like, may be utilized as a further identifier of a user or person seeking to register or engage in a transaction.

The date/time data utilized to provide a precise, and therefore unique, value for a digitized signature record is relatively easy to verify and is not easily modified or duplicated, especially with time specified to the millisecond. Even for a local area network where an administrator may have the ability and opportunity to change (e.g., falsify) time and date information, the millisecond time data is not easily duplicated and so can serve as a unique identifier. An advantage of data/time data is that it permits mobility for a user who need not be limited to a particular computer and/or terminal, or a particular Internet port, as is the case where the identity of the hardware is the basis for security and/or verification.

Further, the digitized signature software downloaded from the web-based application may optionally include or be associated with a voice recognition and/or speech synthesis module that is similarly downloaded to the user's computer for allowing user access to the application via spoken commands in response to synthesized speech commands, such as would be helpful for persons who are visually impaired. The aural messages to the impaired user would include instructions and prompts as to when and how to enter data and to sign his signature and whether the signature as signed was sufficiently aligned with the position and/or pressure sensitive pad to have been captured as a locus-based digitized signature. Such speech recognition and synthesis modules may remain on the user's computer for future use, if desired. Alternatively, where the user's computer contains speech recognition and/or recognition software, as may be the case where it is included in an operating system or other application, the web-based application may be enabled to test for the presence of such software and to utilize it as described.

APPENDIX I

DIGITIZED SIGNATURE CAPTURE PROGRAM

```
Copyright 2002, AI Technology, Inc. All Rights Reserved
StartSign()
{
    CaptureSignature();
    ProduceSignatureData();
}
CaptureSignature()
{
    recycling until sign ending button pressed
    {
        switch(stylus action)
        {
            case StylusDown:
                StylusDown(Point point);
                Break;
            case StylusMove:
                StylusMove(Point point);
                Break;
            case StylusUp:
                StylusUp(Point point);
                Break;
        }
    }
}
Struct Point {int x; int y};
Point * m_pointArray; //Array data recording series of points
StylusDown(Point point)
{
    if(!IsWithinSignArea(point))
        return;
    SetCapture();    //Capture the stylus until raising.
    m_ptPrev = point; //Serves as the MoveTo() anchor point for the
                      //LineTo() the next point, as the user drags the mouse.
    m_pointArray.Add(point);    //record the start point of a stroke
}
StylusMove(Point point)
{
    if(GetCapture() != this)    //if during the procedure of capture signature
        return;
    if(!IsWithinSignArea(point))
        return;
    get display area handle 'dc';
    dc.MoveTo(m_ptPrev);    //display the locus of signature segment
    dc.LineTo(point);
    //record the increment value to the previous point
    m_pointArray.Add(Point((point.x-m_ptPrev.x),(point.y-m_ptPrev.y)));
    m_ptPrev = point;
}
StylusUp(Point point)
{
    if(GetCapture() != this) //if during the procedure of capture signature
        return;
    ReleaseCapture(); //Release the mouse capture established at
                      //the beginning of the mouse drag: OnLButtonDown
    if(IsWithinSignArea(point))
    {
        get display area handle 'dc';
        dc.MoveTo(m_13 ptPrev);    //display the orbit of signature segment
        dc.LineTo(point);
        //record the increment value to the previous point
        m_pointArray.Add(CPoint((point.x-m_ptPrev.x),(point.y-m_ptPrev.y)));
    }
    m_pointArray.Add(Point(-256,-256)); //mark the end of this stroke
}
ProduceSignatureData()
{
    Point pt;
```

APPENDIX I-continued

DIGITIZED SIGNATURE CAPTURE PROGRAM

```
    BOOL NewLnId;
    USHRT StartPt[2];
    CHAR PtDis[2];
    GetSamplingValue(); //Checking the Sampling Points per Second
    GetBitNum(); //Calculating NeededBits for Each Relative Continuous Point
    NewLnId = 1; //identifier of starting a new stroke
    m_SignData = "";
    //Convert the signature data to Hexadecimal string
    for (int i=0; i<m_pointArray.GetSize(); i++)
    {
        pt = m_pointArray[i];
        if(NewLnId == 1)    //record start point data of a stroke
        {
            StartPt[0] = pt.x;
            StartPt[1] = pt.y;
            NewLnId = 0; //identifier of following by continuous points
            //the start point values are recorded with 2 bytes binary value
            RecordStartSignatureData(StartPt);
        }
        else
        {
            PtDis[0] = pt.x;
            PtDis[1] = pt.y;
            //for the sequent point and end mark, the x and y value are
            //recorded with (xBits+yBits) bits binary data
            RecordSequenceSignatureData(PtDis);
            if(pt.x == -256 && pt.y == -256)    //encounter stroke end mark
                NewLnId = 1;
        }
    }
    EncryptFinalSignatureData();
}
GetBitNum()
{
    if(xMaxDis>127 || xMinDis<-127)
        xBits = 9;      //-255 - 255
    else if(xMaxDis>63 || xMinDis<-63)
        xBits = 8;      //-127 - 127
    else if(xMaxDis>31 || xMinDis<-31)
        xBits = 7;      //-63 - 63
    else if(xMaxDis>15 || xMinDis<-15)
        xBits = 6;      //-31 - 31
    else if(xMaxDis>7 || xMinDis<-7)
        xBits = 5;      //-15 - 15
    else if(xMaxDis>3 || xMinDis<-3)
        xBits = 4;      //-7 - 7
    else if(xMaxDis>1 || xMinDis<-1)
        xBits = 3;      //-3 - 3
    else
        xBits = 2;
    if(yMaxDis>127 || yMinDis<-127)
        yBits = 9;      //-255 - 255
    else if(yMaxDis>63 || yMinDis<-63)
        yBits = 8;      //-127 - 127
    else if(yMaxDis>31 || yMinDis<-31)
        yBits = 7;      //-63 - 63
    else if(yMaxDis>15 || yMinDis<-15)
        yBits = 6;      //-31 - 31
    else if(yMaxDis>7 || yMinDis<-7)
        yBits = 5;      //-15 - 15
    else if(yMaxDis>3 || yMinDis<-3)
        yBits = 4;      //-7 - 7
    else if(yMaxDis>1 || yMinDis<-1)
        yBits = 3;      //-3 - 3
    else
        yBits = 2;
    if(m_pointArray.GetSize()>0)
    {
        m_SignSize = ((m_pointArray.GetSize()-m_StrokeNum)*(xBits+yBits)
                + m_StrokeNum*24 + 7)/8 + 2;
        //2 means 1st byte for recording xBits & yBits, 2nd byte for recoding
        //sampling value
        //Allocate a memory space to store final compressed signature data
        pBitsMem = GlobalLock(GlobalAlloc(GHND, m_SignSize));
        FillMemory(pBitsMem,m_SignSize, 0x00);
        UCHAR BitNum = (xBits<<4) | yBits;
        ((unsigned char*)pBitsMem)[0] = BitNum;
```

APPENDIX I-continued

DIGITIZED SIGNATURE CAPTURE PROGRAM

```
        ((unsigned char*)pBitsMem)[1] = SamplingVal;
        NextBitPos = 16;     //from 0
    }
}
Copyright 2002, AI Technology, Inc. AllRights Reserved
```

APPENDIX II

DIGITIZED SIGNATURE CONVERSION PROGRAM

```
Copyright 2002, AI Technology, Inc. All Rights Reserved
Struct Point {int x; int y};
Point * m_pointArray; //Array data of series points of signature locus
float fSignScale;     //the scale of signature size vs. bitmap area
void* pBits;  //Pointer to a binary data memory block with bmp format
#define BMPWIDTH 120
#define BMPHEIGHT 60
ConvertToBmp()
{
    HBITMAP pBm;
    //Obtain Signature series of points from database or file
    m_pointArray = ReadSignData();
    //allocate a block of binary data block
    pBits = GlobalLock(GlobalAlloc(GHND,(UINT)120*(UINT)60));
    FillMemory(pBits, BMPWIDTH * BMPHEIGHT, 0xFF);
    CreateBmp();
    pBm = CreateBitmap(BMPWIDTH, BMPHEIGHT,1,1,pBits);
    SaveToBmp(pBm,"sign.bmp");
}
CreateBmp()
{
    float xscale, yscale;
        BOOL NewLnId;
    int i, xshift, yshift;
    Point pt, ptPrev;
    NewLnId = 1;
    for (i=0; i<m_pointArray.GetSize(); i++)
    {
        pt = m_pointArray.ElementAt(i);
        if(pt.x == -100 && pt.y == -100)
        {
            //fill locus data into a binary memory block with bmp format
            LineTo(ptPrev.x, ptPrev.y);
            NewLnId = 1;
            continue;
        }
        if(NewLnId == 1)
        {
            //fill start point into a binary data memory block of bmp format
            MoveTo(pt.x, pt.y);
            ptPrev = pt;
            NewLnId = 0;
        }
        else
        {
            ptPrev.x += pt.x;
            ptPrev.y += pt.y;
            //fill locus data into a binary data memory block with bmp format
            LineTo(ptPrev.x, ptPrev.y);
        }
    }
}
int ox;
int oy;
MoveTo(x, y)
{
    setPixel(x,y);
    ox = x;
    oy = y;
}
LineTo(x, y)
{
    int ptx, pty;
    recycle(ptx = (ox to x), pty = (oy to y))
```

APPENDIX II-continued

DIGITIZED SIGNATURE CONVERSION PROGRAM

```
        setPixel(ptx, pty);
    ox = x;
    oy = y;
}
setPixel(x, y)
{
    long i, bitpos;
    int subbit;
    unsigned char basebit = 0x80, bytebit;
    bitpos = y*(BMPWIDTH+8) + x;
    i = bitpos/8;
    subbit = bitpos - i*8;
    bytebit = ~((basebit)>>subbit);
    ((unsigned char*)pBits)[i] &= bytebit;
}
SaveToBmp(HBITMAP PBitmap, LPTSTR szFile)
{
    HDC     hDC;
    DWORD   dwPaletteSize=0, dwBmBitsSize, dwDIBSize, dwWritten;
    BITMAP      Bitmap;
    HBITMAP     hBitmap = PBitmap;
    BITMAPFILEHEADER bmfHdr;
    BITMAPINFOHEADER bi;
    LPBITMAPINFOHEADER lpbi;
    HANDLE      fh, hDib, hPal,hOldPal=NULL;
    dwPaletteSize = 2*sizeof(RGBQUAD);
    GetObject(hBitmap, sizeof(BITMAP), (LPSTR)&Bitmap);
    bi.biSize       = sizeof(BITMAPINFOHEADER);
    bi.biWidth      = Bitmap.bmWidth;
    bi.biHeight     = Bitmap.bmHeight;
    bi.biPlanes     = 1;
    bi.biBitCount   = 1;
    bi.biCompression    = BI_RGB;
    bi.biSizeImage  = 0;
    bi.biXPelsPerMeter  = 0;
    bi.biYPelsPerMeter  = 0;
    bi.biClrUsed    = 0;
    bi.biClrImportant   = 0;
    dwBmBitsSize = ((Bitmap.bmWidth+31)/32) * 4 * Bitmap.bmHeight ;
    hDib =
GlobalAlloc(GHND,dwBmBitsSize+dwPaletteSize+sizeof(BITMAPINFOHEADER));
    lpbi = (LPBITMAPINFOHEADER)GlobalLock(hDib);
    *lpbi = bi;
    hPal = GetStockObject(DEFAULT_PALETTE);
    if (hPal)
    {
        hDC = ::GetDC(NULL);
        hOldPal = ::SelectPalette(hDC, (HPALETTE)hPal, FALSE);
        RealizePalette(hDC);
    }
    GetDIBits(hDC, hBitmap, 0, (UINT) Bitmap.bmHeight,
        (LPSTR)lpbi+sizeof(BITMAPINFOHEADER)+dwPaletteSize,
(LPBITMAPINFO)lpbi, DIB_RGB_COLORS);
    if (hOldPal)
    {
        SelectPalette(hDC, (HPALETTE)hOldPal, TRUE);
        RealizePalette(hDC);
        ::ReleaseDC(NULL, hDC);
    }
    fh = CreateFile(szFile, GENERIC_WRITE, 0, NULL, CREATE_ALWAYS,
            FILE_ATTRIBUTE_NORMAL | FILE_FLAG_SEQUENTIAL_SCAN, NULL);
    if (fh == INVALID_HANDLE_VALUE)
        return;
    bmfHdr.bfType = 0x4D42; // "BM"
    dwDIBSize = sizeof(BITMAPFILEHEADER)
            + sizeof(BITMAPINFOHEADER)
                + dwPaletteSize + dwBmBitsSize;
    bmfHdr.bfSize = dwDIBSize;
    bmfHdr.bfReserved1 = 0;
    bmfHdr.bfReserved2 = 0;
    bmfHdr.bfOffBits = (DWORD)sizeof(BITMAPFILEHEADER)
        + (DWORD)sizeof(BITMAPINFOHEADER)
        + dwPaletteSize;
    WriteFile(fh, (LPSTR)&bmfHdr, sizeof(BITMAPFILEHEADER), &dwWritten,
            NULL);
    WriteFile(fh, (LPSTR)lpbi, dwDIBSize-sizeof(BITMAPFILEHEADER),
            &dwWritten, NULL);
```

APPENDIX II-continued

DIGITIZED SIGNATURE CONVERSION PROGRAM

```
GlobalUnlock(hDib);
GlobalFree(hDib);
CloseHandle(fh);
```
Copyright 2002, AI Technology, Inc. All Rights reserved

---

What is claimed is:

1. A method for authenticating a digitized signature comprising:

recording at least the position coordinates of points of a first signature and coding the recorded points in coordinates relative to a coordinate of a previous point of the first signature and the time of the points thereof;

recording at least the position coordinates of points of a second signature and coding the recorded points in coordinates relative to a coordinate of a previous point of the second signature and the time of the points thereof;

generating for each of the first and second signatures from the recorded coded point coordinates and times thereof at least two corresponding characteristics of each signature including:
(a) a size and shape of the signature,
(b) a number of strokes of the signature,
(c) a length of strokes of the signature,
(d) a number of closed loops of the signature,
(e) an order or sequence of strokes of the signature,
(f) a tangent of one or more strokes of the signature,
(g) a tangent of one or more segments of the strokes of the signature,
(h) a time between the starting point and an ending point of the signature,
(i) a time of a stroke or of a segment of a stroke of the signature,
(j) a speed of a stroke or of a segment of a stroke of the signature,
(k) a pressure of a stroke or of a segment of a stroke of the signature,
(l) a derivative of any of characteristics (f) through (k);

comparing the at least two characteristics generated for the first signature to the corresponding at least two characteristics generated for the second signature; and identifying or authenticating the second signature if the comparison of the at least two characteristics thereof to the corresponding at least two characteristics of the first signature correlate to at least a predetermined value.

2. The method of claim 1 wherein said comparing comprises for each of the at least two characteristics generated for the first and second signatures:

generating a ratio of a value of a characteristic generated for the first signature and a value of the corresponding characteristic generated for the second signature.

3. The method of claim 2 further comprising:

weighting each of the ratios of the values of each of the at least two characteristics; and multiplying the weighted ratios of the values.

4. The method of claim 3 wherein said authenticating comprises comparing the value of the multiplied weighted ratios to the predetermined value.

5. The method of claim 2 wherein said generating a ratio comprises:

dividing a value of a given characteristic of one of the first and second signatures by the value of the given characteristic of the other of the first and second signatures, wherein the one of the first and second signatures has a value of the given characteristic that is less than or equal to the value of the given characteristic of the other of the first and second signatures, whereby the ratio has a value between zero and unity.

6. The method of claim 1 wherein each said recording comprises:

signing a signature on a signing surface providing an indication of the location of a stylus on the signing surface;

(a) recording and coding the location of the stylus when placed on the signing surface for defining a starting point of each stroke of the signature, wherein the starting point of a first stroke of the signature defines the starting point of the signature;

(b) recording and coding point locations of the stylus on the signing surface relative to a previous point until the stylus is lifted off the signing surface, thereby defining a stroke of the signature between the starting point and the lift off point;

(c) recording a sampling time or rate at which each recorded point location is recorded; and (d) repeating steps (a) through (b) for each subsequent stroke of the signature until the signature is completely signed.

7. The method of claim 6 wherein each said recording further comprises:

determining a maximum number of bits for coding the differences in location of any point location of the stylus relative to the immediately previous point location thereof, and coding an indication of the determined maximum number of bits, wherein the location of the starting point of each stroke is coded in no more than two bytes and the point locations of each stroke are each coded in no more than one byte.

8. The method of claim 1 wherein said identifying or authenticating further comprises:

providing an indication of a non-authentication and a possible forgery when the at least two characteristics of the first and second signatures correlate to a value less than a first threshold value, wherein the first threshold value is less than the predetermined value; and/ providing an indication of electronic copying when the at least two characteristics of the first and second signatures correlate to a value greater than a second threshold value, wherein the second threshold value is greater than the predetermined value.

9. The method of claim 7 wherein the first threshold value is in a range of about 0.2 to about 0.45 on a scale of zero to one, and wherein the second threshold value is about 0.8 or greater on the scale of zero to one.

10. The method of claim 1 wherein the previous point is the point immediately previous to the point of a stroke of a signature then being recorded.

11. The method of claim 1 wherein, in each said recording step, the time of the points thereof is represented by a sampling time or rate at which each recorded point location is recorded.

12. The method of claim 1 wherein said identifying or authenticating comprises:
  displaying the first and second signatures from the respective recorded coded point coordinates thereof; and/or
  displaying the first and second signatures from the respective recorded coded point coordinates and times thereof in a movie format; and/or
  displaying a value generated in said comparing the at least two characteristics of the first and second signatures.

13. A method for authenticating first and second digitized signatures recorded in respective digitized signature records, wherein each digitized signature record includes at least the position of points of a signature in coordinates relative to a coordinate of a previous point thereof, and the time of the points thereof, comprising:
  generating from each of the first and second digitized signature records at least two ratios of respective corresponding characteristics of each signature including:
    (a) a ratio of respective sizes and shapes of the first and second signatures,
    (b) a ratio of respective numbers of strokes of the first and second signatures,
    (c) a ratio of respective lengths of strokes of the first and second signatures,
    (d) a ratio of respective numbers of closed loops of the first and second signatures,
    (e) a ratio of respective orders or sequences of the strokes of the first and second signatures,
    (f) a ratio of respective tangents of one or more strokes of the first and second signatures,
    (g) a ratio of respective tangents of one or more segments of the strokes of the first and second signatures,
    (h) a ratio of respective times between the starting points and ending points of the first and second signatures,
    (i) a ratio of respective times of a stroke or of a segment of a stroke of the first and second signatures,
    (j) a ratio of respective speeds of a stroke or of a segment of a stroke of the signature,
    (k) a ratio of respective pressures of a stroke or of a segment of a stroke of the signature,
    (l) a ratio of respective derivatives of any of characteristics of ratios (f) through (k) of the first and second signatures;
  comparing the respective at least two ratios of respective corresponding characteristics generated from the first and second signature records; and
  providing an indication whether said comparing the respective at least two ratios relating to the first and second signatures exceeds or does not exceed a predetermined value.

14. The method of claim 13 further comprising:
  weighting each of the at least two ratios; and
  multiplying the weighted at least two ratios.

15. The method of claim 14 wherein said providing an indication comprises comparing the value of the multiplied weighted at least two ratios to the predetermined value.

16. The method of claim 15 wherein said providing an indication comprises:

providing an indication of a possible forgery or a non-authentication when the value of the multiplied weighted at least two ratios is less than a first threshold value; and/or
  providing an indication of a questionable authentication or an authentication when the value of the multiplied weighted at least two ratios is between the first threshold value and a second threshold value that is greater than the first threshold value; and/or
  providing an indication of an authentication when the value of the multiplied weighted at least two ratios is between the second threshold value and a third threshold value that is greater than the second threshold value; and/or
  providing an indication of electronic copying when the value of the multiplied weighted at least two ratios is greater than the third threshold value.

17. The method of claim 16 wherein the first threshold value is in a range of about 0.2 to about 0.45 on a scale of zero to one, wherein the second threshold value is in a range of about 0.45 to about 0.8 on the scale of zero to one, and wherein the third threshold value is about 0.8 or greater on the scale of zero to one.

18. The method of claim 13 wherein each digitized signature record includes at least one of date/time data and a relational check code generated from the values of the at least the position of each point of a signature in coordinates relative to a coordinate of a previous point thereof,
  further comprising, prior to said generating at least two ratios:
    separating the at least one of the date/time data and the relational check code from the values of the at least the position of each point of a signature in coordinates relative to a coordinate of a previous point thereof.

19. The method of claim 13 wherein each digitized signature record includes at least a relational check code generated from the values of the at least the position of each point of a signature in coordinates relative to a coordinate of a previous point thereof,
  further comprising, prior to said generating at least two ratios:
    verifying the relational check code against the values of the at least the position of each point of a signature in coordinates relative to a coordinate of a previous point thereof.

20. The method of claim 19 wherein said verifying includes:
  regenerating a relational check code from the values of the at least the position of each point of a signature in coordinates relative to a coordinate of a previous point thereof of the digitized signature record; and
  comparing the regenerated relational check value to the relational check code of the digitized signature record.

21. The method of claim 13 wherein the previous point is the point immediately previous to each point other than a starting point of a stroke of a signature.

22. The method of claim 13 wherein, in each digitized signature record, the time of the points thereof is represented by a sampling time or rate at which the point positions are recorded.

23. The method of claim 13 wherein said providing an indication comprises:
  displaying the first and second digitized signatures from the respective recorded coded point coordinates thereof; and/or displaying the first and second digitized signatures from the respective recorded coded point coordinates and times thereof in a movie format; and/or displaying a value generated in said comparing the at least two characteristics of the first and second digitized signatures.

24. A method for authenticating a transaction digitized signature against a plurality of reference digitized signatures represented by respective reference digitized signature records, wherein each digitized signature record includes at least the position of points of a signature in coordinates relative to a coordinate of a previous point thereof and the time of the points thereof, comprising:

generating a transaction digitized signature record for the transaction digitized signature;

generating from each of the transaction and reference digitized signature records at least two ratios of respective corresponding characteristics of the transaction and reference signatures including:
(a) a ratio of respective sizes and shapes of the transaction and reference signatures,
(b) a ratio of respective numbers of strokes of the transaction and reference signatures,
(c) a ratio of respective lengths of strokes of the transaction and reference signatures,
(d) a ratio of respective numbers of closed loops of the transaction and reference signatures,
(e) a ratio of respective orders or sequences of the strokes of the transaction and reference signatures,
(f) a ratio of respective tangents of one or more strokes of the transaction and reference signatures,
(g) a ratio of respective tangents of one or more segments of the strokes of the transaction and reference signatures,
(h) a ratio of respective times between the starting points and ending points of the transaction and reference signatures,
(i) a ratio of respective times of a stroke or of a segment of a stroke of the transaction and reference signatures,
(j) a ratio of respective speeds of a stroke or of a segment of a stroke of the transaction and reference signatures,
(k) a ratio of respective pressures of a stroke or of a segment of a stroke of the transaction and reference signatures,
(l) a ratio of respective derivatives of any of characteristics of ratios (f) through (k) of the transaction and reference signatures;

comparing the respective at least two ratios of respective corresponding characteristics generated from the transaction and reference signature records; and providing an indication whether said comparing the respective at least two ratios relating to the transaction and reference signatures exceeds or does not exceed a predetermined value.

25. The method of claim 24 further comprising:
weighting each of the at least two ratios; and
multiplying the weighted at least two ratios.

26. The method of claim 25 wherein said providing an indication comprises comparing the value of the multiplied weighted at least two ratios to the predetermined value.

27. The method of claim 25 wherein said providing an indication comprises:

providing an indication of a possible forgery or a non-authentication when the value of the multiplied weighted at least two ratios is less than a first threshold value; and/or providing an indication of a questionable authentication or an authentication when the value of the multiplied weighted at least two ratios is between the first threshold value and a second threshold value that is greater than the first threshold value; and/or providing an indication of an authentication when the value of the multiplied weighted at least two ratios is between the second threshold value and a third threshold value that is greater than the second threshold value; and/or providing an indication of electronic copying when the value of the multiplied weighted at least two ratios is greater than the third threshold value.

28. The method of claim 27 wherein the first threshold value is in a range of about 0.2 to about 0.45 on a scale of zero to one, wherein the second threshold value is in a range of about 0.45 to about 0.8 on the scale of zero to one, and wherein the third threshold value is about 0.8 or greater on the scale of zero to one.

29. The method of claim 24 wherein each digitized signature record includes at least one of date/time data and a relational check code generated from the values of the at least the position of each point of a signature in coordinates relative to a coordinate of a previous point thereof, further comprising, prior to said generating at least two ratios:
separating the at least one of the date/time data and the relational check code from the values of the at least the position of each point of a signature in coordinates relative to a coordinate of a previous point thereof.

30. The method of claim 24 wherein each digitized signature record includes at least a relational check code generated from the values of the at least the position of each point of a signature in coordinates relative to a coordinate of a previous point thereof, further comprising, prior to said generating at least two ratios:
verifying the relational check code against the values of the at least the position of each point of a signature in coordinates relative to a coordinate of a previous point thereof.

31. The method of claim 30 wherein said verifying includes:

regenerating a relational check code from the values of the at least the position of each point of a signature in coordinates relative to a coordinate of a previous point thereof; and comparing the regenerated relational check value to the relational check code of the digitized signature record.

32. The method of claim 24 further comprising, prior to said generating at least two ratios:

generating for the transaction digitized record signature and for each reference digitized signature record an indexing value representative of values utilized in elements (a) through (l) of said generating at least two ratios;

then selecting reference digitized signature records having the same indexing value as the transaction digitized signature record; and then said generating at least two ratios for the transaction digitized signature record and the selected reference digitized signature records.

33. The method of claim 32 wherein said generating an indexing value includes generating an ordered set of values representative of quantized portions of the values utilized for said generating at least two ratios.

34. The method of claim 24 wherein the previous point is the point immediately previous to each point other than a starting point of a stroke of a signature.

35. The method of claim 24 wherein, in each digitized signature record, the time of the points thereof is represented by a sampling time or rate at which the point positions are recorded.

36. The method of claim 24 wherein said providing an indication comprises:
  displaying the transaction and reference digitized signatures from the respective recorded coded point coordinates thereof; and/or
  displaying the transaction and reference digitized signatures from the respective recorded coded point coordinates and times thereof in a movie format; and/or
  displaying a value generated in said comparing the respective at least two ratios of the transaction and reference digitized signatures.

37. A method for generating a digitized signature record from a signature signed on a signing surface providing an indication of the location of a stylus on the signing surface comprising:
  (a) recording the location of the stylus when placed on the signing surface for defining a starting point of each stroke of the signature, wherein the starting point of a first stroke of the signature defines the starting point of the signature;
  (b) recording point locations of the stylus on the signing surface until the stylus is lifted off the signing surface, thereby defining a stroke of the signature between the starting point and the lift off point;
  (c) repeating steps (a) and (b) for each subsequent stroke of the signature until the signature is completely signed;
  (d) determining a number of bits for storing the point locations of the strokes of the signature and storing the determined number of bits in the digitized signature record;
  (e) storing in the digitized signature record a sampling time or rate at which the recorded points are recorded;
  (f) storing in the digitized signature record the locations of the starting points of each stroke of the signature; and
  (g) coding in the determined number of bits the locations of the points of each stroke of the signature in values relative to a starting point or an immediately previous point thereof and storing same in the digitized signature record; and
  whereby the digitized signature record includes at least the positions of points of a signature in coordinates relative to a starting point or an immediately previous point thereof and the timing thereof.

38. The method of claim 37 wherein said recording recited in steps (a) and (b) each comprises recording the x and y coordinates of the position of the stylus on the signing surface.

39. The method of claim 37 further comprising:
  generating a relational check code from the locations of the starting points and points of each stroke of the signature stored in the digitized signature record; and
  associating the relational check code with the digitized signature record.

40. The method of claim 37 further comprising:
  associating date and time data with the digitized signature record;
  generating a relational check code from the date and time data and from the locations of the starting points and points of each stroke of the signature stored in the digitized signature record,
  associating the relational check code with the digitized signature record.

41. The method of claim 40 wherein said associating date and time data includes:
  communicating the digitized signature record via a server; and
  associating date and time data from the server with the digitized signature record.

42. The method of claim 37 further comprising:
  communicating the digitized signature record via a server; and
  associating date and time data from the server with the digitized signature record.

43. The method of claim 37 wherein step (d) comprises:
  determining a number of bits for storing the x and y coordinates of point locations of the strokes of the signature; and
  storing the determined number of bits for storing the x coordinates and the determined number of bits for storing the y coordinates in one byte of the digitized signature record.

44. The method of claim 37 wherein steps (f) and (g) comprise:
  storing in the digitized signature record the x and y coordinates of the starting point of a stroke of the signature in respective first and second bytes thereof representative of the stroke;
  coding in the number of bits determined in step (d) the differences of the x and y coordinates of the points of the stroke of the signature relative to a starting point or to an immediately previous point, and storing same in the digitized signature record;
  storing in the digitized signature record an end mark value representative of the end of a stroke; and
  repeating each of the foregoing three steps for each stroke of the digitized signature.

45. The method of claim 37 further comprising representing the signature stored in the digitized signature record in an image format, wherein said representing comprises:
  (a) reading a point location from the digitized signature record;
  (b) determining whether the read point location is the starting point of a stroke;
  (c) if the read point location is the starting point of a stroke, then:
    setting a pixel in the image format located at the location of the read point to a display value,
    storing the pixel location and display value in the image format, and
    returning to step (a) hereof for reading the next point location;
  (d) if the read point location is not the starting point of a stroke, then:
    setting a line of pixels in the image format located in locations from the read point location of the previous read point to the read point location of the present read point to a display value,
    storing the pixel locations and display values of the line of pixels in the image format, and
    returning to step (a) hereof for reading the next point location;
  (e) repeating steps (a) through (d) for all of strokes of the digitized signature record.

46. The method of claim 37 wherein the signing surface provides an indication of the pressure of the stylus on the signing surface, said recording set forth in steps (a) and (b) further comprising recording the pressure of the stylus on the signing surface; and said method further comprising storing in the digitized signature record the pressure of the stylus on the signing surface.

47. The method of claim 37 further comprising comparing the digitized signature record with a reference digitized signature record for authenticating the signature, and/or verifying the signature, and/or identifying the signer of the signature.

48. A method for initiating a transaction employing a digitized signature comprising:

accessing an application via a computer coupled to a web site via a server for providing transaction data, wherein the application is enabled for a transaction employing a digitized signature;

generating a digitized transaction signature record including:

signing a transaction signature on an electronic pad coupled to the computer to generate digitized transaction signature data including at least the positions of points of a signature in coordinates relative to a coordinate of a previous point thereof and the time of the points thereof, and generating a relational check code representative of the value of at least the positions of the points of the digitized transaction signature data, whereby the digitized transaction signature record includes the positions of the points of the digitized transaction signature and the relational check code representative thereof;

communicating via the computer and the server the transaction data and the digitized transaction signature record to the application for initiating the transaction; and at the application:

retrieving one or more digitized reference signature records relating to the transaction, wherein each digitized reference signature record is representative of a digitized reference signature;

generating from each of the transaction and reference digitized signature records at least two ratios of respective corresponding characteristics of the transaction and reference signatures including:

(a) a ratio of respective sizes and shapes of the transaction and reference signatures, (b) a ratio of respective numbers of strokes of the transaction and reference signatures, (c) a ratio of respective lengths of strokes of the transaction and reference signatures, (d) a ratio of respective numbers of closed loops of the transaction and reference signatures, (e) a ratio of respective orders or sequences of the strokes of the transaction and reference signatures, (f) a ratio of respective tangents of one or more strokes of the transaction and reference signatures, (g) a ratio of respective tangents of one or more segments of the strokes of the transaction and reference signatures, (h) a ratio of respective times between the starting points and ending points of the transaction and reference signatures, (i) a ratio of respective times of a stroke or of a segment of a stroke of the transaction and reference signatures, (j) a ratio of respective speeds of a stroke or of a segment of a stroke of the transaction and reference signatures, (k) a ratio of respective pressures of a stroke or of a segment of a stroke of the transaction and reference signatures, (l) a ratio of respective derivatives of any of characteristics of ratios (f) through (k) of the transaction and reference signatures;

comparing the respective at least two ratios of respective corresponding characteristics generated from the transaction and reference signature records to determine a probability that the digitized transaction and reference signatures are or are not the same; and communicating to the computer via the server an indication whether the probability determined by said comparing the respective at least two ratios relating to the transaction and reference signatures meets or does not meet at least one predetermined criteria for initiating the transaction.

49. The method of claim 48:

wherein said retrieving comprises retrieving a digitized reference signature record corresponding to particular data of the transaction data, and wherein the predetermined criteria includes that the determined probability that the digitized transaction and reference signatures are the same is greater than a predetermined probability.

50. The method of claim 49 wherein the predetermined probability is one of about 0.45, about 0.5, about 0.6, about 0.7, about 0.75 and about 0.8, on a scale of zero to one.

51. The method of claim 48:

wherein said retrieving comprises retrieving the digitized reference signature records corresponding to all transactions initiated during a given time period, and wherein the predetermined criteria includes that the determined probability that the digitized transaction and reference signatures are the same is less than a predetermined probability.

52. The method of claim 51 wherein the predetermined probability is one of about 0.45, about 0.4, about 0.3, about 0.25 and about 0.2, on a scale of zero to one.

53. The method of claim 48 further comprising:

weighting each of the at least two ratios;

multiplying the weighted at least two ratios; and wherein said providing an indication comprises comparing the value of the multiplied weighted at least two ratios to the predetermined value.

54. The method of claim 53 wherein said providing an indication includes:

providing an indication of a possible forgery or a non-authentication when the value of the multiplied weighted at least two ratios is less than a first threshold value; and/or providing an indication of a questionable authentication or an authentication when the value of the multiplied weighted at least two ratios is between the first threshold value and a second threshold value that is greater than the first threshold value; and/or providing an indication of an authentication when the value of the multiplied weighted at least two ratios is between the second threshold value and a third threshold value that is greater than the second threshold value; and/or providing an indication of electronic copying when the value of the multiplied weighted at least two ratios is greater than the third threshold value.

55. The method of claim 54 wherein the first threshold value is in a range of about 0.2 to about 0.45 on a scale of zero to one, wherein the second threshold value is in a range of about 0.45 to about 0.8 on the scale of zero to one, and wherein the third threshold value is about 0.8 or greater, on the scale of zero to one.

56. The method of claim 48 wherein said generating a relational check code comprises:

associating date and time data with the digitized transaction signature record; and generating the relational check code from the values of the at least the position of each point of a signature in coordinates relative to a coordinate of a previous point thereof and from the date and time data; and further comprising, prior to said generating at least two ratios:

separating the date and time data and the relational check code from the values of the at least the position of each point of a signature in coordinates relative to a coordinate of a previous point thereof.

57. The method of claim 48 further comprising, prior to said generating at least two ratios:

verifying the relational check code against the values of the at least the position of each point of a signature in coordinates relative to a coordinate of a previous point thereof.

58. The method of claim 57 wherein said verifying the relational check code comprises:

regenerating a relational check code from the values of the at least the position of each point of a signature in coordinates relative to a coordinate of a previous point thereof of the digitized signature record; and comparing the regenerated relational check value to the relational check code of the digitized signature record.

59. The method of claim 48 further comprising, prior to said generating at least two ratios:

generating for the digitized transaction signature record and for each digitized reference signature record an indexing value representative of values utilized in ones of elements (a) through (1) of said generating at least two ratios;

then selecting digitized reference signature records having the same indexing value as the digitized transaction signature record; and then said generating at least two ratios for the digitized transaction signature record and the selected digitized reference signature records.

60. The method of claim 59 wherein said generating an indexing value includes generating an ordered set of values representative of quantized portions of the values utilized for said generating at least two ratios.

61. The method of claim 48 wherein the transaction comprises at least one of: voting, registering to vote, verifying eligibility to vote, purchasing of goods and/or services, a banking transaction, a debit and/or credit card transaction, a financial transaction, an insurance transaction, an Internet transaction, an "e-commerce" transaction, physical security, information security, access control, military, defense and government, manufacturing, wholesaling, distributing and retailing, medical treatment and pharmacy, and dispensing medication and/or a medical device.

62. The method of claim 48 wherein said comparing is for authenticating the transaction signature, and/or verifying the transaction signature, and/or identifying a signer of the transaction signature.

63. The method of claim 48 wherein said communicating to the computer via the server an indication comprises:

displaying at the computer an image of the transaction and/or reference digitized signatures from the respective recorded coded point coordinates thereof and/or displaying at the computer an image of the transaction and reference digitized signatures from the respective recorded coded point coordinates and times thereof in a movie format; and/or displaying at the computer a value generated in said comparing the respective at least two ratios of the transaction and reference digitized signatures.

64. A storage medium encoded with machine-readable computer instructions for authenticating a transaction digitized signature against a plurality of reference digitized signatures represented by respective reference digitized signature records, wherein each digitized signature record includes at least the position of points of a signature in coordinates relative to a coordinate of a previous point thereof and the time of the points thereof, comprising:

means for causing a computer to generate a transaction digitized signature record for the transaction digitized signature;

means for causing the computer to generate from each of the transaction and reference digitized signature records at least two ratios of respective corresponding characteristics of the transaction and reference signatures including:

(a) a ratio of respective sizes and shapes of the transaction and reference signatures, (b) a ratio of respective numbers of strokes of the transaction and reference signatures, (c) a ratio of respective lengths of strokes of the transaction and reference signatures, (d) a ratio of respective numbers of closed loops of the transaction and reference signatures, (e) a ratio of respective orders or sequences of the strokes of the transaction and reference signatures, (f) a ratio of respective tangents of one or more strokes of the transaction and reference signatures, (g) a ratio of respective tangents of one or more segments of the strokes of the transaction and reference signatures, (h) a ratio of respective times between the starting points and ending points of the transaction and reference signatures, (i) a ratio of respective times of a stroke or of a segment of a stroke of the transaction and reference signatures, (j) a ratio of respective speeds of a stroke or of a segment of a stroke of the transaction and reference signatures, (k) a ratio of respective pressures of a stroke or of a segment of a stroke of the transaction and reference signatures, (l) a ratio of respective derivatives of any of characteristics of ratios (f) through (k) of the transaction and reference signatures;

means for causing the computer to compare the respective at least two ratios of respective corresponding characteristics generated from the transaction and reference signature records; and means for causing the computer to provide an indication whether the causing the computer to compare the respective at least two ratios relating to the transaction and reference signatures exceeds or does not exceed a predetermined value.

65. The storage medium of claim 64 further comprising:

means for causing the computer to weight each of the at least two ratios; and means for causing the computer to multiply the weighted at least two ratios.

66. The storage medium of claim 65 wherein said means for causing the computer to provide an indication comprises means for causing the computer to compare the value of the multiplied weighted at least two ratios to the predetermined value.

67. The storage medium of claim 65 wherein said means for causing the computer to provide an indication comprises:

means for causing the computer to provide an indication of a possible forgery or a non-authentication when the value of the multiplied weighted at least two ratios is less than a first threshold value; and/or means for causing the computer to provide an indication of a questionable authentication or an authentication when the value of the multiplied weighted at least two ratios is between the first threshold value and a second threshold value that is greater than the first threshold value; and/or means for causing the computer to provide an indication of an authentication when the value of the multiplied weighted at least two ratios is between the second threshold value and a third threshold value that is greater than the second threshold value; and/or means for causing the computer to provide an indication of electronic copying when the value of the multiplied weighted at least two ratios is greater than the third threshold value.

68. The storage medium of claim 67 wherein the first threshold value is in a range of about 0.2 to about 0.45 on a scale of zero to one, wherein the second threshold value is in a range of about 0.45 to about 0.8 on the scale of zero to one, and wherein the third threshold value is about 0.8 or greater on the scale of zero to one.

69. The storage medium of claim 64 wherein each digitized signature record includes at least one of date/time data and a relational check code generated from the values of the at least the position of each point of a signature in coordinates relative to a coordinate of a previous point thereof, further comprising, prior to said generating at least two ratios:

means for causing the computer to separate the at least one of the date/time data and the relational check code from the values of the at least the position of each point of a signature in coordinates relative to a coordinate of a previous point thereof.

70. The storage medium of claim 64 wherein each digitized signature record includes at least a relational check code generated from the values of the at least the position of each point of a signature in coordinates relative to a coordinate of a previous point thereof, further comprising, prior to said generating at least two ratios:

means for causing the computer to verify the relational check code against the values of the at least the position of each point of a signature in coordinates relative to a coordinate of a previous point thereof.

71. The storage medium of claim 70 wherein said means for causing the computer to verify includes:

means for causing the computer to regenerate a relational check code from the values of the at least the position of each point of a signature in coordinates relative to a coordinate of a previous point thereof; and means for causing the computer to compare the regenerated relational check code to the relational check code of the digitized signature record.

72. The storage medium of claim 64 further comprising, prior to causing a computer to generate at least two ratios:

means for causing the computer to generate for the transaction digitized record signature and for each reference digitized signature record an indexing value representative of values utilized in elements (a) through (1) of the means for causing the computer to generate at least two ratios;

means for causing the computer to then select reference digitized signature records having the same indexing value as the transaction digitized signature record; and said means for causing the computer to generate at least two ratios then generating at least two ratios for the transaction digitized signature record and the selected reference digitized signature records.

73. The storage medium of claim 72 wherein said means for causing the computer to generate an indexing value includes means for causing the computer to generate an ordered set of values representative of quantized portions of the values utilized for said generating at least two ratios.

74. The storage medium of claim 64 wherein said means for causing the computer to provide an indication comprises:

means for causing the computer to display the first and second digitized signatures from the respective recorded coded point coordinates thereof; and/or means for causing the computer to display the first and second digitized signatures from the respective recorded coded point coordinates and times thereof in a movie format; and/or means for causing the computer to display a value generated in said comparing the at least two characteristics of the first and second digitized signatures.

75. A method for authenticating a transaction digitized signature against a plurality of reference digitized signatures represented by respective reference digitized signature records, wherein each digitized signature record includes at least the position of points of a signature in coordinates relative to a coordinate of a previous point thereof and the time of the points thereof, comprising:

generating a transaction digitized signature record for the transaction digitized signature;

generating for each of the transaction and reference digitized signature records at least two corresponding characteristics of each signature including:

(a) a size and shape of the signature, (b) a number of strokes of the signature, (c) a length of strokes of the signature, (d) a number of closed loops of the signature, (e) an order or sequence of strokes of the signature, (f) a tangent of one or more strokes of the signature, (g) a tangent of one or more segments of the strokes of the signature, (h) a time between the starting point and an ending point of the signature, (i) a time of a stroke or of a segment of a stroke of the signature, (j) a speed of a stroke or of a segment of a stroke of the signature, (k) a pressure of a stroke or of a segment of a stroke of the signature, (l) a derivative of any of characteristics (f) through (k);

generating for the transaction digitized record signature and for each reference digitized signature record an indexing value representative of values generated in steps (a) through (k);

selecting reference digitized signature records having the same indexing value as the transaction digitized signature record; and generating at least two ratios of the at least two corresponding characteristics for the transaction digitized signature record and the selected reference digitized signature records;

comparing the respective at least two ratios of respective corresponding characteristics generated from the transaction and reference signature records; and providing an indication whether said comparing the respective at least two ratios relating to the transaction and reference signatures exceeds or does not exceed a predetermined value.

76. The method of claim 75 wherein said generating an indexing value includes generating an ordered set of values representative of quantized portions of the values utilized for said generating at least two ratios.

77. The method of claim 75 further comprising:
weighting each of the at least two ratios; and
multiplying the weighted at least two ratios.

78. The method of claim 77 wherein said providing an indication comprises comparing the value of the multiplied weighted at least two ratios to the predetermined value.

79. The method of claim 77 wherein said providing an indication comprises:

providing an indication of a possible forgery or a non-authentication when the value of the multiplied weighted at least two ratios is less than a first threshold value; and/or providing an indication of a questionable authentication or an authentication when the value of the multiplied weighted at least two ratios is between the first threshold value and a second threshold value that is greater than the first threshold value; and/or providing an indication of an authentication when the value of the multiplied weighted at least two ratios is between the second threshold value and a third threshold value that is greater than the second threshold value; and/or providing an indication of electronic copying when the value of the multiplied weighted at least two ratios is greater than the third threshold value.

80. The method of claim 75 wherein said comparing is for authenticating the transaction signature, and/or verifying the transaction signature, and/or identifying a signer of the transaction signature.

81. The method of claim 75 wherein said providing an indication comprises:

displaying the transaction and reference signatures from the respective recorded coded point coordinates thereof; and/or displaying the transaction and reference signatures from the respective recorded coded point coordinates and times thereof in a movie format; and/or displaying a value generated in said comparing the respective at least two ratios of the transaction and reference signatures.

82. A method for identifying a signer of a transaction digitized signature against a plurality of reference digitized signatures represented by respective reference digitized signature records each including identifying information of a respective signer thereof, , wherein each digitized signature record includes at least the position of points of a signature in coordinates relative to a coordinate of a previous point thereof and the time of the points thereof, comprising:

generating a transaction digitized signature record for the transaction digitized signature;

generating for each of the transaction and reference digitized signature records at least two corresponding characteristics of each signature including:

(a) a size and shape of the signature, (b) a number of strokes of the signature, (c) a length of strokes of the signature, (d) a number of closed loops of the signature, (e) an order or sequence of strokes of the signature, (f) a tangent of one or more strokes of the signature, (g) a tangent of one or more segments of the strokes of the signature, (h) a time between the starting point and an ending point of the signature, (i) a time of a stroke or of a segment of a stroke of the signature, (j) a speed of a stroke or of a segment of a stroke of the signature, (k) a pressure of a stroke or of a segment of a stroke of the signature, (l) a derivative of any of characteristics (f) through (k);

generating for the transaction digitized record signature and for each reference digitized signature record an indexing value representative of values generated in steps (a) through (l);

selecting reference digitized signature records having the same indexing value as the transaction digitized signature record; and generating at least two ratios of the at least two corresponding characteristics for the transaction digitized signature record and the selected reference digitized signature records;

comparing the respective at least two ratios of respective corresponding characteristics generated from the transaction and reference digitized signature records;

selecting each of the compared reference digitized signature records for which said comparing the respective at least two ratios relating to the transaction and reference digitized signatures is within a predetermined range of values; and providing the identifying information of each selected compared reference digitized signature within the predetermined range of values.

83. The method of claim 82 wherein said generating an indexing value includes generating an ordered set of values representative of quantized portions of the values utilized for said generating at least two ratios.

84. The method of claim 82 further comprising:
weighting each of the at least two ratios; and
multiplying the weighted at least two ratios.

85. The method of claim 84 wherein said selecting each of the compared reference digitized signature records comprises selecting the multiplied weighted at least two ratios within the predetermined range of values.

86. The method of claim 82 further comprising:

displaying the transaction digitized signature and/or the refeence digitized signature of the selected compared reference digitized signature record; and/or displaying the transaction digitized signature and/or the reference digitized signature of the selected compared reference digitized signature record in a movie format; and/or displaying for the transaction digitized signature and/or for the reference digitized signature of the selected compared reference digitized signature record a value generated in said comparing the respective at least two ratios of respective corresponding characteristics generated from the transaction and reference digitized signature records.

* * * * *